United States Patent

Gunji et al.

[11] Patent Number: 5,547,771
[45] Date of Patent: Aug. 20, 1996

[54] HIGH-HARDNESS METAL SKIN FILM

[75] Inventors: Takahiro Gunji; Masamune Tabata; Kenji Dosaka; Kenji Hirose, all of Saitama, Japan

[73] Assignee: Honda Giken Kogyo Kabushiki Kaisha, Tokyo, Japan

[21] Appl. No.: 424,873

[22] Filed: Apr. 17, 1995

[30] Foreign Application Priority Data

Apr. 18, 1994 [JP] Japan .................. 6-103322
May 31, 1994 [JP] Japan .................. 6-141161
May 17, 1994 [JP] Japan .................. 6-128289

[51] Int. Cl.⁶ ..................................... B32B 15/00
[52] U.S. Cl. .................. 428/687; 428/681; 428/935
[58] Field of Search .................. 428/687, 935, 428/653, 681; 384/912

[56] References Cited

U.S. PATENT DOCUMENTS

| | | | |
|---|---|---|---|
| 4,153,483 | 5/1979 | Holzl | 428/627 |
| 4,239,819 | 12/1980 | Holzl | 428/627 |
| 4,900,622 | 2/1990 | Nakayama et al. | 428/336 |
| 5,051,856 | 9/1991 | Narishige et al. | 360/126 |
| 5,167,788 | 12/1992 | Hardee et al. | 428/687 |
| 5,342,698 | 8/1994 | Fujisawa et al. | 428/687 |
| 5,443,920 | 8/1995 | Fujisawa et al. | 428/687 |
| 5,445,684 | 8/1995 | Gunji et al. | 428/687 |

FOREIGN PATENT DOCUMENTS 6174089 6/1994 Japan.

*Primary Examiner*—John Zimmerman
*Attorney, Agent, or Firm*—Lyon & Lyon

[57] ABSTRACT

A high-hardness metal skin film is formed of an aggregate of metal crystals. The area rate A of pyramid-shaped metal crystals in a surface of the skin film is in a range of $A \geq 40\%$. The aggregate contains at least one element selected from boron (B), carbon (C) and hydrogen (H) as an added element, wherein the B content is in a range of $B \geq 0.01\%$ by weight, the C content is in a range of $C \geq 0.03\%$ by weight, and the H content is in a range of $H \geq 0.01\%$ by weight. The skin surface takes on an intricate aspect due to the presence of a large number pyramid-shaped metal crystals and hence, has a good oil retention. In addition, the wear of each pyramid-shaped metal crystal is inhibited by an increase in hardness produced with the containment of boron and/or carbon and/or hydrogen and therefore, the oil retention is maintained.

13 Claims, 26 Drawing Sheets

2μm

5μm

10μm

10μm

5μm

10μm

HIGH-HARDNESS METAL SKIN FILM

BACKGROUND OF THE INVENTION

1. Field of the Invention

The present invention relates to a high-hardness metal skin film, and particularly, to a metal skin film formed of an aggregate of metal crystals and having a high hardness.

2. Description of the Prior Art

Conventionally known metal skin films of this type include an Fe-plated layer provided on an outer peripheral surface of a base material of steel, for example, in a piston pin for an internal combustion engine in order to improve the wear resistance.

Under existing circumstances where high speed and high output of the internal combustion engine are desired, however, the known metal skin film has a problem that the oil-maintaining property, namely, the oil retention, is not sufficient and the seizure resistance is poor, due to the slide surface being relatively flat.

Therefore, the present applicant has previously developed a metal skin film having a large number of pyramid-shaped metal crystals in a slide surface (for example, see Japanese Patent Application Laid-open No. 174089/94 and U.S. patent application Ser. No. 08/162,520, filed Dec. 3, 1993, now U.S. Pat. No. 5,445,684).

If the metal skin film is formed in the above manner, the adjacent metal crystals assume mutually biting states and therefore, the slide surface takes on an intricate aspect including a large number of fine crest portions, a large number of fine valley portions formed between the crests, and a large number of fine swamps formed due to the mutual biting of the crests. Therefore, the metal skin film has a good oil retention. This improves the seizure resistance of the metal skin film.

As a result of various examinations of the metal skin film, it has been ascertained that the metal skin film is relatively low and hence, in order to allow the skin film to be adapted to a severe sliding environment, it is necessary to increase the hardness of the metal skin film and to inhibit the wear of the pyramid-shaped metal crystals in the sliding environment to maintain the good oil retention of the metal skin film.

It has been also ascertained that in the severe sliding environment, the tip end portions of the pyramid-shaped metal crystals are plastically deformed so that the valley portions of the slide surface are deformed and eliminated, and the tip end portions are worn into an indented configuration in such a manner that they are torn off. As a result, the oil retention by the valley portions is reduced, but also the friction coefficient is increased and for this reason, the sliding characteristic is substantially reduced.

In order to improve the thermal conductivity of the metal skin to efficiently diffuse the frictional heat generated with the sliding movement, it is convenient that the metal skin is formed to have a large number of columnar metal crystals grown from the base material rather than being formed as an aggregate of granular metal crystals. This is because each of the columnar metal crystals serves as a good medium for transferring heat to the base material.

In the metal skin containing a large number of columnar metal crystals as forming components, however, there is a problem that grain boundaries exist parallel toga direction of growth of the columnar metal crystals and for this reason, when a tensile load is applied in a direction intersecting the direction of growth, the grain boundaries are liable to be cracked. There is also a problem that the columnar metal crystals are liable to be relatively increased in grain size and hence, it is impossible to sufficiently increase the hardness of the metal skin.

SUMMARY OF THE INVENTION

Accordingly, it is an object of the present invention to provide a metal skin film of the type described above, which has a hardness as high as required for the above demands to be satisfied, and which is optimized as a slide surface construction.

To achieve the above object, according to the present invention, there is provided a high-hardness metal skin film formed of an aggregate of metal crystals, wherein the area rate A of pyramid-shaped metal crystals in a skin surface is in a range of $A \geq 40\%$, and the aggregate contains at least one element selected from carbon and hydrogen as an added element, the content of carbon being in a range of $C \geq 0.03\%$ by weight, and the content of hydrogen being in a range of $H \geq 0.01\%$ by weight.

In this case, it is desirable that at least a portion of hydrogen is present within the pyramid-shaped metal crystals.

If the area rate A of the pyramid-shaped metal crystals are specified in the above manner, the adjacent pyramid-shaped metal crystals assume mutually biting states and hence, the skin surface takes on an intricate aspect including a large number of fine crest portins, a large number of fine valley portions formed between the crests, and a large number of fine swamps formed due to the mutual biting of the crests.

If the content of carbon (C) in the aggregate is set in the above manner, it is possible to substantially increase the hardness of the metal skin.

If such a metal skin is used as a slide surface construction, the wear of the pyramid-shaped metal crystals is inhibited even in a severe sliding environment and hence, a good oil retention of the slide surface construction is maintained under lubrication, while the sliding load is dispersed under non-lubrication by an infinite number of fine pyramid-shaped metal crystals. Thus, the slide surface construction exhibits an excellent seizure resistance under lubrication and under non-lubrication.

It is also possible to form a metal skin film of the above-described type on a bolt seating surface, so that hard pyramid-shaped metal crystals bite into a surface of an opposed member, thereby preventing the loosing of a bolt.

It is undesirable that the area rate A of the pyramid-shaped metal crystals is smaller than 40%, because the skin surface tends to be simplified in such a range of the area rate A. If the C content is smaller than 0.03% by weight, the degree of increase in hardness of the metal skin is lower. On the other hand, it is desirable that an upper limit of the C content is 0.8% by weight. If the C content is greater than 0.8% by weight, it is difficult to form the metal crystals into a pyramid shape in the skin surface.

If the content of hydrogen (H content) in the aggregate is specified in the above manner, it is possible to increase the hardness of the pyramid-shaped metal crystals and to permit at least a portion of hydrogen to exist within the pyramid-shaped metal crystals.

If such a metal skin film is used as a slide surface construction, the plastic deformation of a tip end portion of the pyramid-shaped metal crystal in a sliding movement is avoided, and due to a brittleness produced with containment of hydrogen, the tip end portion of the pyramid-shaped metal crystal is sheared and worn in a direction intersecting a direction of height thereof. As a result, an oil retention by the valley portions is insured. In addition, a surface-surface sliding movement is produced and therefore, the friction coefficient is reduced, whereby the slide surface construction exhibits an excellent sliding characteristic.

If the H content is smaller than 0.01% by weight, the degree of increase in hardness of the pyramid-shaped metal crystals is lower. In addition, the amount of hydrogen present within the pyramid-shaped metal crystals is decreased and for this reason, the above-described shearing is not performed. On the other hand, it is desirable that an upper limit of the H content is 0.1% by weight. If the H content is greater than 0.1% by weight, the hardness HmV of the metal skin is equal to or greater than 900 and for this reason, the skin film is liable to crack.

It is another object of the present invention to provide a metal skin film of the above-described type, wherein a crystal grain boundary between the columnar metal crystals is reinforced, and the diametrical growth of columnar metal crystals is inhibited to provide a fine division of the columnar metal crystal, thereby achieving an increase in hardness and thus an increase in strength.

To achieve the above object, according to the present invention, there is provided a metal skin film formed of an aggregate of metal crystals, wherein the aggregate includes a large number of columnar metal crystals each grown from a base material and each having a tip end of pyramid-shaped metal crystal, an area rate A of the pyramid-shaped metal crystals in a surface of the skin film is in a range of $A \geq 40\%$; and the content of boron (B) in the aggregate is in a range of $B \geq 0.01\%$ by weight, or the aggregate contains boron (B) as a necessary added element, and at least one element selected from carbon (C) and hydrogen (H) as a selective added element, the B content being in a range of $B \geq 0.01\%$ by weight, the C content being in a range of $C \geq 0.03\%$ by weight, and the H content being in a range of $H \geq 0.01\%$ by weight.

If a particular amount of boron is contained as described above, boron is preferentially precipitated at a grain boundary between the adjacent columnar metal crystals to reinforce the grain boundary. The diametrical growth of the adjacent columnar metal crystals is inhibited by the preferential precipitation at the grain boundary and therefore, the columnar metal crystal is finely divided, resulting in an increase in hardness of the metal skin film. In this manner, an increase in strength of the metal skin film is achieved.

However, if the B content is smaller than 0.01% by weight, the abilities to reinforce the grain boundary and to inhibit the diametrical growth are lower and hence, it is failed to provide an increase in strength of the metal skin film. It is desirable that an upper limit of the B content is 3.7% by weight. If the B content is greater than 3.7% by weight, a B-based intermetallic compound is precipitated at the grain boundary, resulting in a considerably reduced strength of the metal skin film.

The functioning effects of pyramid-shaped metal crystals, carbon and hydrogen are similar to those described above.

The above and other objects, features and advantages of the invention will become apparent from the following description of preferred embodiments taken in conjunction with the accompanying drawings.

DESCRIPTION OF THE PREFERRED EMBODIMENTS

First embodiment

Figure 1:
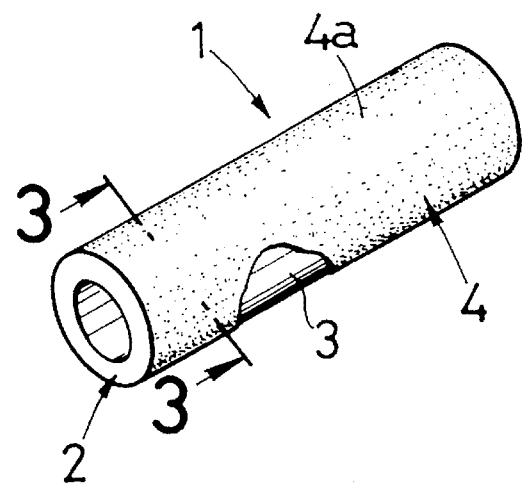
FIG. 1 is a broken perspective view of an essential portion of a piston pin.

Referring to FIG. 1, a piston pin 1 for an internal combustion engine has a round tubular base material 2 of steel, and a stratified slide surface construction 4 in the form of a metal skin film formed on an outer periphery 3 of the base material 2 by plating.

Figure 2:
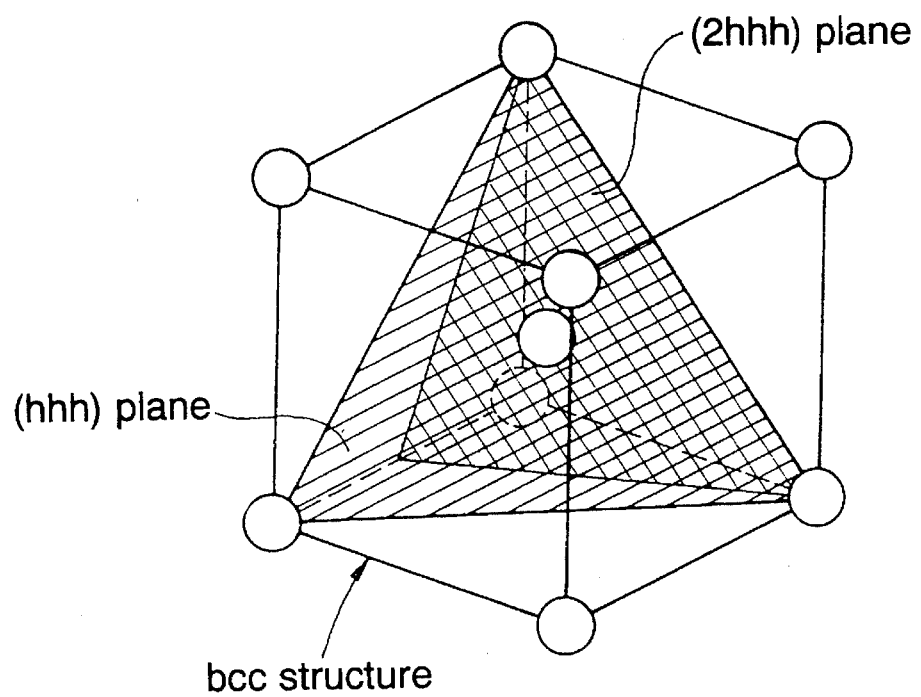
FIG. 2 is a perspective view illustrating a body-centered cubic (bcc) structure and its (hhh) and (2 hhh) planes.
Figure 3:
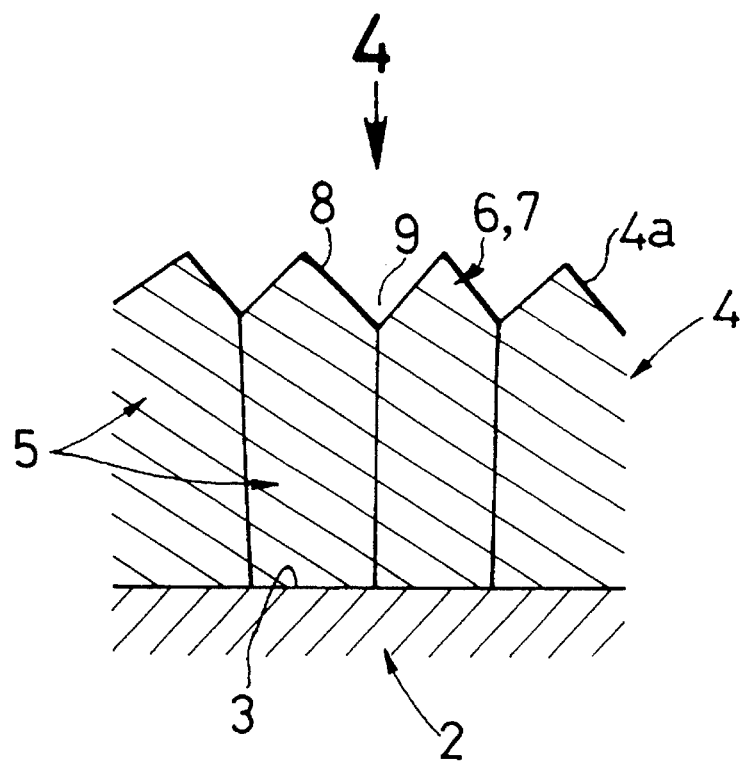
FIG. 3 is an enlarged sectional view taken along a line 3—3 in FIG. 1.

As shown in FIGS. 2 and 3, the slide surface construction 4 is formed of an aggregate of metal crystals having a body-centered cubic structure (bcc structure) in the embodiment. The aggregate contains carbon (C) which is an added element, and the content of C in the aggregate is set at a value equal or to greater than 0.03% by weight (C≧0.03%). The aggregate includes a large number of columnar metal crystals 5 grown from the outer peripheral surface 3 of the base material 2. The columnar metal crystal 5 is at least one of an (hhh) oriented metal crystal with an (hhh) plane (by Miller indices) directed to a slide surface (a surface of the skin film) 4a, and a (2 hhh) oriented metal crystal with a (2 hhh) plane (by Miller indices) directed to the slide surface 4a.

Figure 4:
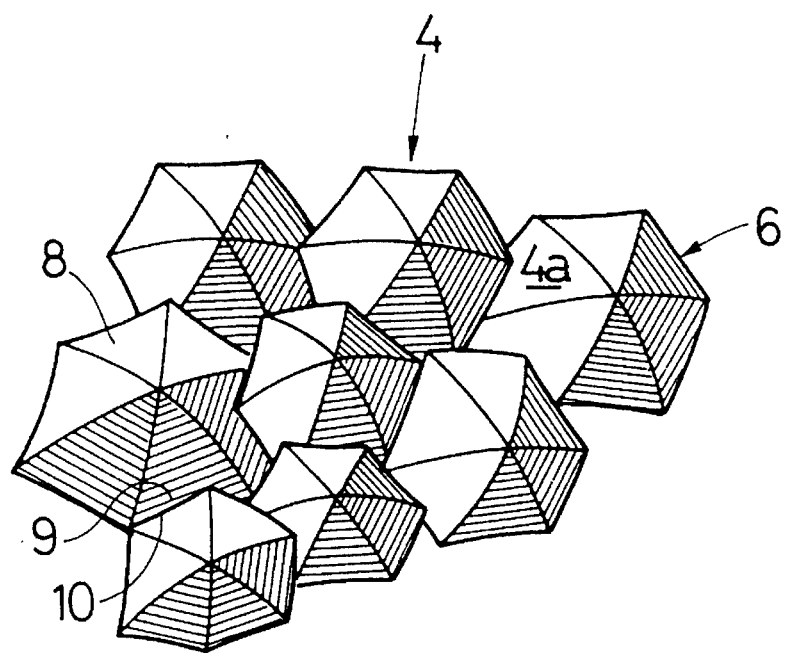
FIG. 4 is a view taken along an arrow 4 in FIG. 3.
Figure 5:
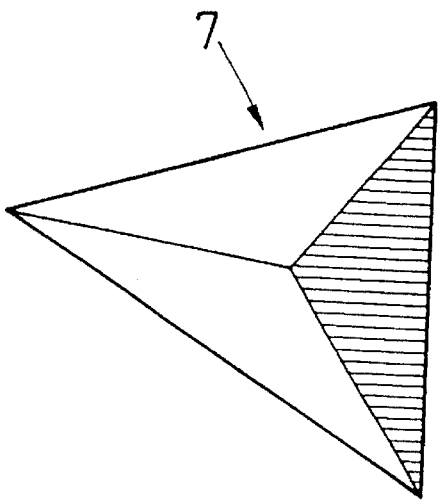
FIG. 5 is a plan view of a trigonal pyramid-shaped metal crystal.

When the columnar metal crystal 5 is the (hhh) oriented metal crystal, a tip end of the columnar metal crystal 5 can be formed into a hexagonal pyramid-shaped metal crystal 6 as shown in FIG. 4, or a trigonal pyramid-shaped metal crystal 7 as shown in FIG. 5 in the slide surface 4a. The hexagonal pyramid-shaped metal crystal 6 is small in average grain size and substantially uniform in grain size, as compared with the trigonal pyramid-shaped metal crystal 7. In the hexagonal pyramid-shaped metal crystals 6 and the like, there is a correlation between the grain size and the height, and hence, the grain sizes are substantially uniform. This means that the height is also substantially equal.

When the columnar metal crystal 5 is the (2 hhh) oriented metal crystal, the tip end of the columnar metal crystal 5 can be formed into a small angular pyramid-shaped metal crystal.

The pyramid-shaped metal crystal such as the hexagonal and trigonal metal crystals 6 and 7 and the small pyramid-shaped metal crystal has an area rate A in the slide surface 4a, which is set to a value equal to or greater than 40% (including 100%).

If the area rate A is set in this manner, two adjacent hexagonal pyramid-shaped metal crystals are in a mutually biting relation. Thus, as compared with a case where a slide surface is formed of trigonal pyramid-shaped metal crystals, the slide surface 4a has an increased surface area, and takes on a very intricate aspect including a large number of extremely fine crest portions 8, a large number of extremely fine valley portions 9 formed between the crest portions 8, and a large number of extremely fine swamps 10 formed due to the mutual biting of the crests 8.

If the C content of the aggregate is set as described above, it is possible to substantially increase the hardness of the slide surface construction 4.

With such a slide surface construction 4, the wear of each of the hexagonal pyramid-shaped metal crystals 6 is inhibited even in a severe slide environment. Therefore, under lubrication, a good oil retention of the slide surface construction 4 is maintained. On the other hand, under non-lubrication, a sliding load is dispersed by an infinite number of extremely fine hexagonal pyramid-shaped metal crystals 6. Thus, the slide surface construction exhibits an excellent seizure resistance under lubrication and under non-lubrication.

Further, as a result of uniformly fine division of the hexagonal pyramid-shaped metal crystals 6, a local increase in surface pressure can be avoided, and the slide load can be finely divided. Thus, the slide surface construction 4 exhibits an excellent wear resistance not only under lubrication but also non-lubrication.

Figure 6:
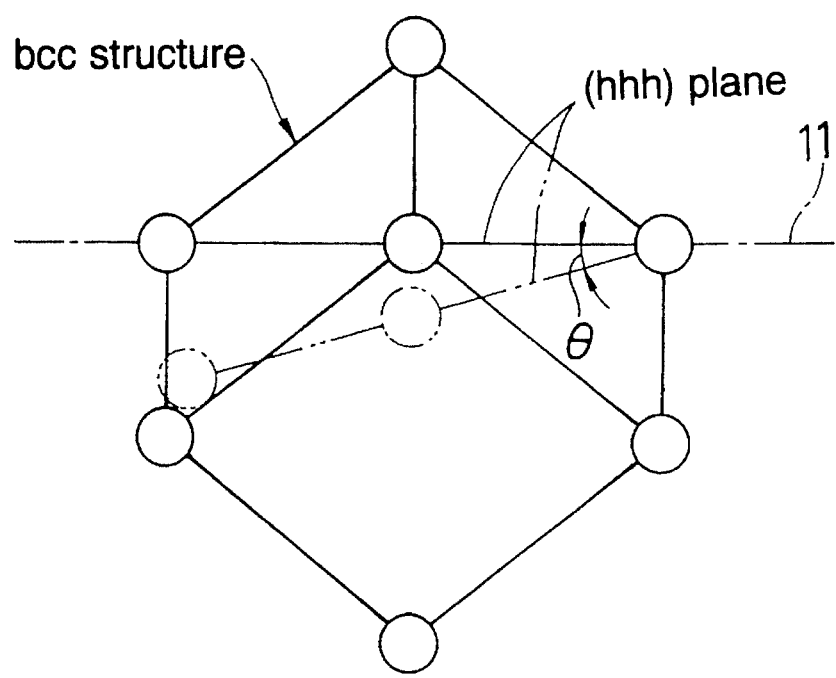
FIG. 6 is a diagram illustrating the body-centered cubic structure and an inclination of a (hhh) plane.

As shown in FIG. 6, an inclination of the (hhh) plane with respect to a phantom plane 11 extending along the slide surface 4a appears in the form of an inclination of hexagonal or trigonal pyramid-shaped metal crystal 6 or 7 and hence, an influence is exerted on the oil retention and wear resistance of the slide surface construction 4. Therefore, the inclination angle θ formed by the (hhh) plane with respect to the phantom plane 11 is set in a range of 0°≦θ≦15°. In this case, the direction of inclination of the (hhh) plane is not limited. If the inclination angle θ is larger than 15°, the oil retention and the wear resistance of the slide surface construction are reduced. The inclination angle θ is the same as with the (2 hhh) plane.

The metal crystals having this bcc structure include those of simple metal such as Fe, Cr, Mo, W, Ta, Zr, Nb, V etc., and the alloys thereof.

In the plating treatment for forming the slide surface construction 4, plating bath conditions for electrical Fe-plating are as given in Table 1.

TABLE 1

| Composition (g/liter) | | | | | Temperature (°C.) |
|---|---|---|---|---|---|
| Ferrous sulfate | Boric acid | Ammonium sulfate | C-containing additive | pH | |
| 100–400 | 0–50 | 0–200 | ≦2 | 3–6.5 | 10–60 |

The C-containing additives which may be used are substances containing carbon that are soluble in water, such as saccharin, gelatin, ascorbic acid and the like.

Figure 7:
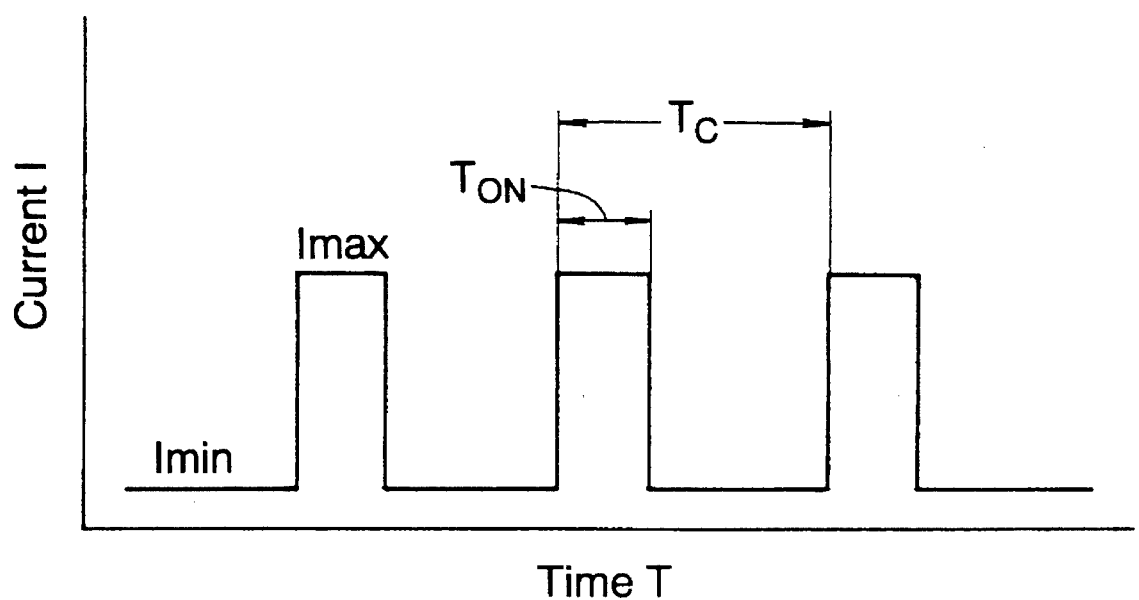
FIG. 7 is a waveform of an output from an electrical plating power supply.

For energization, a pulse current process is mainly utilized. In the pulse current process, as shown in FIG. 7, the electric current I of a plating power supply is controlled to describe a pulse waveform as a time T elapses, such that the current I is increased from a minimum current Imin to reach a maximum current Imax and then lowered to the minimum current Imin.

If an energization time from the start of increasing the current I to the start of lowering thereof is represented by $T_{ON}$, and a cycle time is represented by $T_C$ wherein the period from the start of increasing to the start of next increasing is defined as one cycle, the ratio of the energization time $T_{ON}$ to the cycle time $T_C$, i.e., the time ratio $T_{ON}/T_C$ is set in a range of $T_{ON}/T_C \leq 0.45$. The maximum cathode current density CDmax is set in a range of CDmax$\geq$2 A/dm$^2$ (if necessary, CDmax$\geq$6 A/dm$^2$), and the average cathode current density CDm is set in a range of CDm$\geq$1 A/dm$^2$ (if necessary, CDm$\geq$3 A/dm$^2$).

If such a pulse current process is utilized, the ion concentration in the vicinity of a cathode is unformized due to a current flowing and not flowing in a plating bath. This makes it possible to stabilize the composition of the slide surface construction 4.

In the electric Fe-plating treatment, the precipitation and presence rate of the (hhh) oriented Fe crystals or the (2 hhh) oriented Fe crystals are controlled by changing the plating bath conditions and the energizing conditions. In addition, because the content of carbon (C) in the slide surface construction 4 is extremely small and hence, in order to accurately control the content and to uniformly disperse carbon, a replenisher adjusted to the same composition and temperature as those of the plating bath is supplied in a predetermined amount between the anode and the cathode during the electric Fe-plating. If this supplying is not carried out, a variability is produced in concentration of the C-containing additive in the plating bath and for this reason, it is difficult to control the content of carbon in the slide surface construction.

In addition to electric plating, other examples of the plating treatment are a PVD process, a CVD process, a sputtering process, an ion-plating process and the like which are gas-phase plating processes. Conditions for W- or Mo-plating by a sputtering process include, for example, an argon pressure of 0.2 to 1 Pa, an average argon acceleration power of DC 1 to 1.5 kW, and a base material temperature of 150° to 300° C. In this case, carbon can be incorporated into the slide surface construction 4 by blowing ethylene gas onto the base material. Conditions for W-plating by a CVD process include, for example, a starting material of WF$_6$, a gas flow rate of 2 to 15 cc/min., a chamber internal pressure of 50 to 300 Pa, a base material temperature of 400° to 600° C., and an ArF excimer laser average output of 5 to 40 W. In this case, carbon can be incorporated into the slide surface construction 4 by forcing a methane gas through a chamber at 1 to 10 SCCM (cc/min).

Particular examples will be described below.

A plurality of piston pins 1 for an internal combustion engine were produced by subjecting an outer peripheral surface 3 of a round tubular base material 2 of steel (JIS SCM 420) to an electric Fe-plating to form a slide surface construction made of an aggregate of Fe crystals and having a thickness of 15 μm.

Table 2 shows electrical Fe-plating conditions for examples 1 to 12 of the slide surface constructions. The plating time was varied in a range of 5 to 60 minutes in order to control the thickness in each of the examples 1 to 12 to 15 μm, as described above. The amount of replenisher supplied was set to 0.5 liter/min.

TABLE 2

| Slide surface construction | Plating bath | | | | Pulse current process | | | |
|---|---|---|---|---|---|---|---|---|
| | Composition (g/liter) | | | | | | | |
| | Ferrous sulfate | Saccharin | pH | Temperature (°C.) | CDmax (A/dm$^2$) | CDm (A/dm$^2$) | $T_{ON}/T_C$ | $T_{ON}$ (msec) |
| Example No. 1 | 400 | 0 | 6 | 50 | 20 | 4 | 0.2 | 2 |
| Example No. 2 | 400 | 0.5 | 6 | 50 | 20 | 4 | 0.2 | 2 |
| Example No. 3 | 400 | 0.75 | 6 | 50 | 40 | 8 | 0.2 | 2 |
| Example No. 4 | 400 | 1 | 6 | 50 | 50 | 10 | 0.2 | 2 |
| Example No. 5 | 200 | 0 | 6 | 50 | 15 | 3 | 0.2 | 2 |
| Example No. 6 | 200 | 0.5 | 6 | 50 | 15 | 3 | 0.2 | 2 |
| Example No. 7 | 200 | 0.75 | 6 | 50 | 40 | 8 | 0.2 | 2 |
| Example No. 8 | 200 | 1 | 6 | 50 | 50 | 10 | 0.2 | 2 |
| Example No. 9 | 100 | 0 | 6 | 50 | 15 | 3 | 0.2 | 2 |
| Example No. 10 | 100 | 0.5 | 6 | 50 | 17.5 | 3.5 | 0.2 | 2 |
| Example No. 11 | 100 | 0.75 | 6 | 50 | 40 | 8 | 0.2 | 2 |
| Example No. 12 | 100 | 1 | 6 | 50 | 50 | 10 | 0.2 | 2 |

Table 3 shows the crystal form of the slide surface, the area rate A of trigonal or hexagonal pyramid-shaped Fe crystals in the slide surface, the presence rate S of the oriented Fe crystals, the C content, and the hardness in the section of the slide surface construction for the examples 1 to 12.

TABLE 3

| Slide surface construction | Crystal form of slide surface | Hexagonal or triagonal pyramid-shaped Fe crystal | | Presence rate S of oriented Fe crystal (%) | | | | | C content (% by weight) | Hardness HmV |
|---|---|---|---|---|---|---|---|---|---|---|
| | | Area rate (%) | Grain size (μm) | {110} | {200} | {211} | {310} | {222} | | |
| Example No. 1 | Hexagonal pyramid | 90 | 1–4 | 0.7 | 2 | 5.1 | 0.8 | 91.4 | 0.008 | 200 |
| Example No. 2 | Hexagonal pyramid | 90 | 1–4 | 1 | 1.8 | 4.8 | 1.1 | 91.3 | 0.025 | 250 |
| Example No. 3 | Hexagonal pyramid | 90 | 1–3 | 0.9 | 2.1 | 5.5 | 1.2 | 90.3 | 0.030 | 380 |
| Example No. 4 | Hexagonal pyramid | 90 | 1–3 | 0.9 | 2.4 | 5.6 | 0.8 | 90.3 | 0.050 | 430 |
| Example No. 5 | Trigonal pyramid | 40 | 0.5–5 | 18 | 10.1 | 18.7 | 11.5 | 41.7 | 0.010 | 220 |
| Example No. 6 | Trigonal pyramid | 40 | 0.5–5 | 17.7 | 11.2 | 19.4 | 9.9 | 41.8 | 0.023 | 240 |
| Example No. 7 | Trigonal pyramid | 40 | 0.5–5 | 16.3 | 10.8 | 22.4 | 10.3 | 40.2 | 0.031 | 370 |
| Example No. 8 | Trigonal pyramid | 40 | 0.5–5 | 15 | 11 | 24.6 | 8.9 | 40.5 | 0.045 | 400 |
| Example No. 9 | Trigonal pyramid | 35 | 0.5–6 | 19.8 | 13 | 18.9 | 13.5 | 34.8 | 0.010 | 220 |
| Example No. 10 | Trigonal pyramid | 35 | 0.5–6 | 19.3 | 12.5 | 19.8 | 13.3 | 35.1 | 0.023 | 240 |
| Example No. 11 | Trigonal pyramid | 35 | 0.5–6 | 18.8 | 13 | 19.5 | 13.3 | 35.4 | 0.035 | 380 |
| Example No. 12 | Trigonal pyramid Granular | 35 | 0.5–6 | 19.5 | 12.7 | 19.9 | 11.9 | 36 | 0.050 | 450 |

The area rate A of trigonal or hexagonal pyramid-shaped Fe crystals was determined according to $A=(c/b)\times 100$ (%), wherein b represents an area of the slide surface, and c represents an area occupied by all the trigonal or hexagonal pyramid-shaped Fe crystals in the slide surface. The grain size of the hexagonal pyramid-shaped Fe crystal is the average value of distances between corners mutually opposed on the opposite sides of an apex, i.e., the average value of lengths of the three diagonals. The grain size of the trigonal pyramid-shaped Fe crystal is an average value of distances each from each corner via an apex to an opposed side, i.e., the average value of lengths of the three diagonals. The measurement of the C content was carried out by peeling off each of the examples 1 to 12 from the base material 2 and analyzing each of the examples 1 to 12 according to an infrared ray absorption process (JIS G1211). The C content in each of the examples 1, 5 and 9 may be regarded as an impurity, because no saccharin was added in the plating bath.

Figure 8:
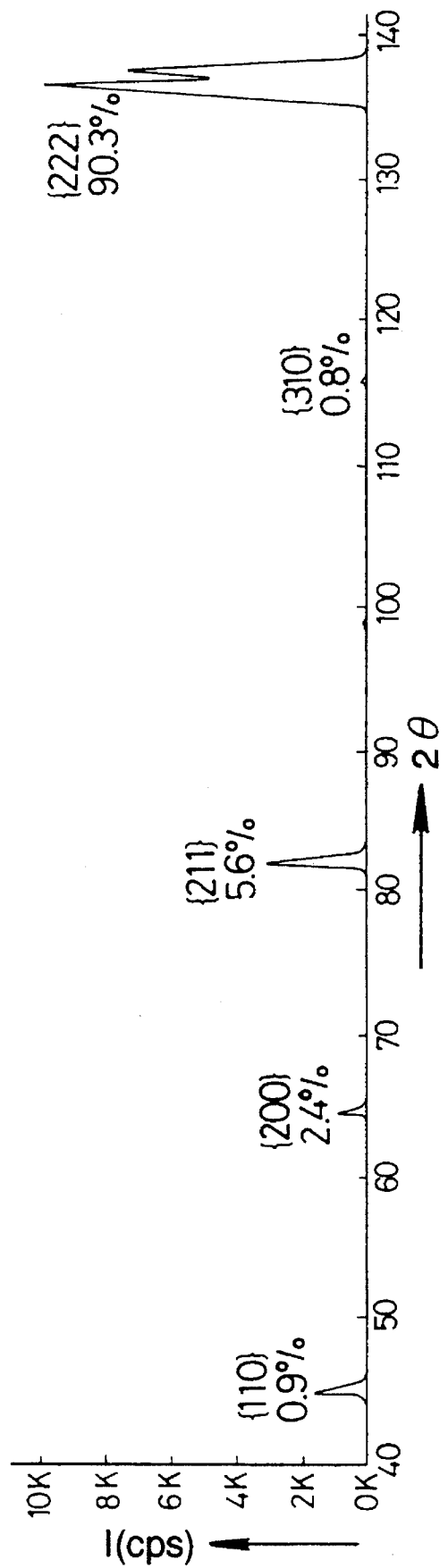
FIG. 8 is an X-ray diffraction pattern for a slide surface construction.

The presence rate S was determined by a following method based on an X-ray diffraction pattern (X-ray was applied in a direction perpendicular to the slide surface) for the examples 1 to 12. As an illustration, the example 4 will be described below. FIG. 8 is an X-ray diffraction pattern for the example 4. The presence rate S of the oriented Fe crystals was determined from a following expression. For example, the term "{110} oriented Fe crystal" means an oriented Fe crystal with its {110} plane oriented toward the slide surface 4a.

{110} oriented Fe crystal: $S_{110}=\{I_{110}/IA_{110})/T\}\times 100$
{200} oriented Fe crystal: $S_{200}=\{I_{200}/IA_{200})/T\}\times 100$
{211} oriented Fe crystal: $S_{211}=\{I_{211}/IA_{211})/T\}\times 100$
{310} oriented Fe crystal: $S_{310}=\{I_{310}/IA_{310})/T\}\times 100$
{222} oriented Fe crystal: $S_{222}=\{I_{222}/IA_{222})/T\}\times 100$ wherein each of $I_{110}$, $I_{200}$, $I_{211}$, $I_{310}$ and $I_{222}$ is a measurement (cps) of intensity of X-ray reflected from each crystal plane, and each of $IA_{110}$, $IA_{200}$, $IA_{211}$, $IA_{310}$ and $IA_{222}$ is an intensity ratio of X-ray reflected from each crystal plane in an ASTM card, i.e., $IA_{110}=100$, $IA_{200}=20$, $IA_{211}=30$, $IA_{310}=12$ and $IA_{222}=6$. Further, $T=(I_{110}/IA_{110})+(I_{200}/IA_{200})+(I_{211}/IA_{211})+(I_{310}/IA_{310})+(I_{222}/IA_{222})$.

Figure 9:
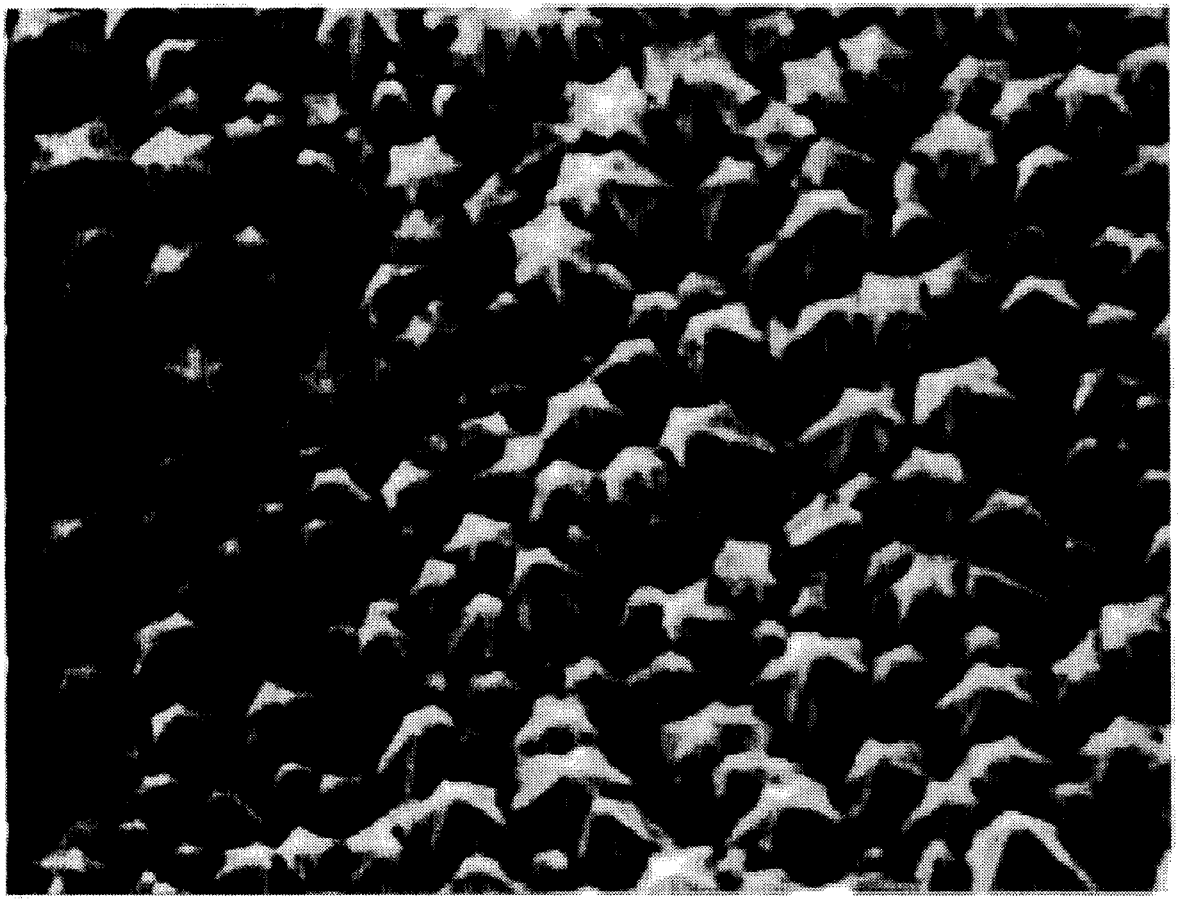
FIG. 9 is a photomicrograph showing a crystal structure of a slide surface.

FIG. 9 is a photomicrograph showing a crystal structure of the slide surface in the example 4, wherein a large number of hexagonal pyramid-shaped Fe crystals are observed. In this case, the area rate A of the hexagonal pyramid-shaped Fe crystals is 90%. This hexagonal pyramid-shaped Fe crystal is a {222} oriented Fe crystal with its (hhh) plane, i.e., (222) oriented toward the slide surface. The presence rate S of the {222} oriented Fe crystals is 90.3% as shown in Table 3 and FIG. 8.

Figure 10:
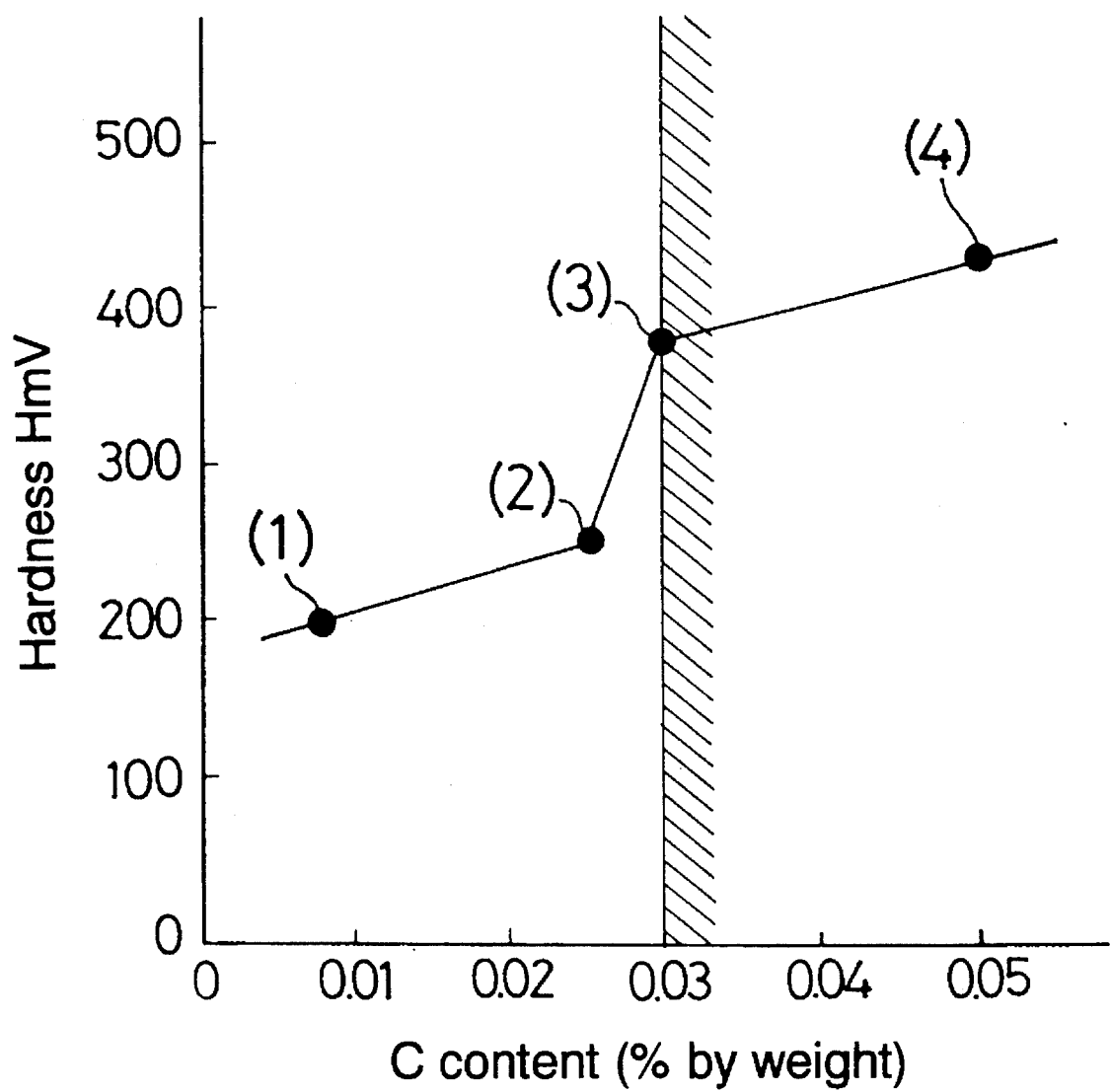
FIG. 10 is a graph illustrating the relationship between the C content and the hardness.

FIG. 10 is a graph illustrating the relationship between the C content and the hardness for the examples 1 to 4. In FIG. 10, points (1) to (4) correspond to the examples 1 to 4, respectively. It can be seen from FIG. 10 that if the C content is set in a range of C≧0.03% by weight, the hardness is abruptly increased. The same is true of the examples 5 to 12.

Chips having the specifications of examples 1 to 12 were fabricated and then subjected to a seizure test in a chip-on-disk manner under lubrication to measure a seizure generating load, thereby providing the results given in Table 4. Conditions for the test are as follows: the material of a disk was Al-10% by weight of Si alloy; the rotational speed of the disk was 15 m/sec; the amount of oil supplied was 0.3 ml/min; and the area of the slide surface of the chip was 1 cm².

TABLE 4

| Slide surface construction | Seizure generating load (N) |
|---|---|
| Example No. 1 | 1400 |
| Example No. 2 | 1500 |
| Example No. 3 | 2000 |
| Example No. 4 | 2200 |
| Example No. 5 | 850 |
| Example No. 6 | 900 |
| Example No. 7 | 1300 |
| Example No. 8 | 1400 |
| Example No. 9 | 300 |
| Example No. 10 | 350 |
| Example No. 11 | 400 |
| Example No. 12 | 500 |

Figure 11:
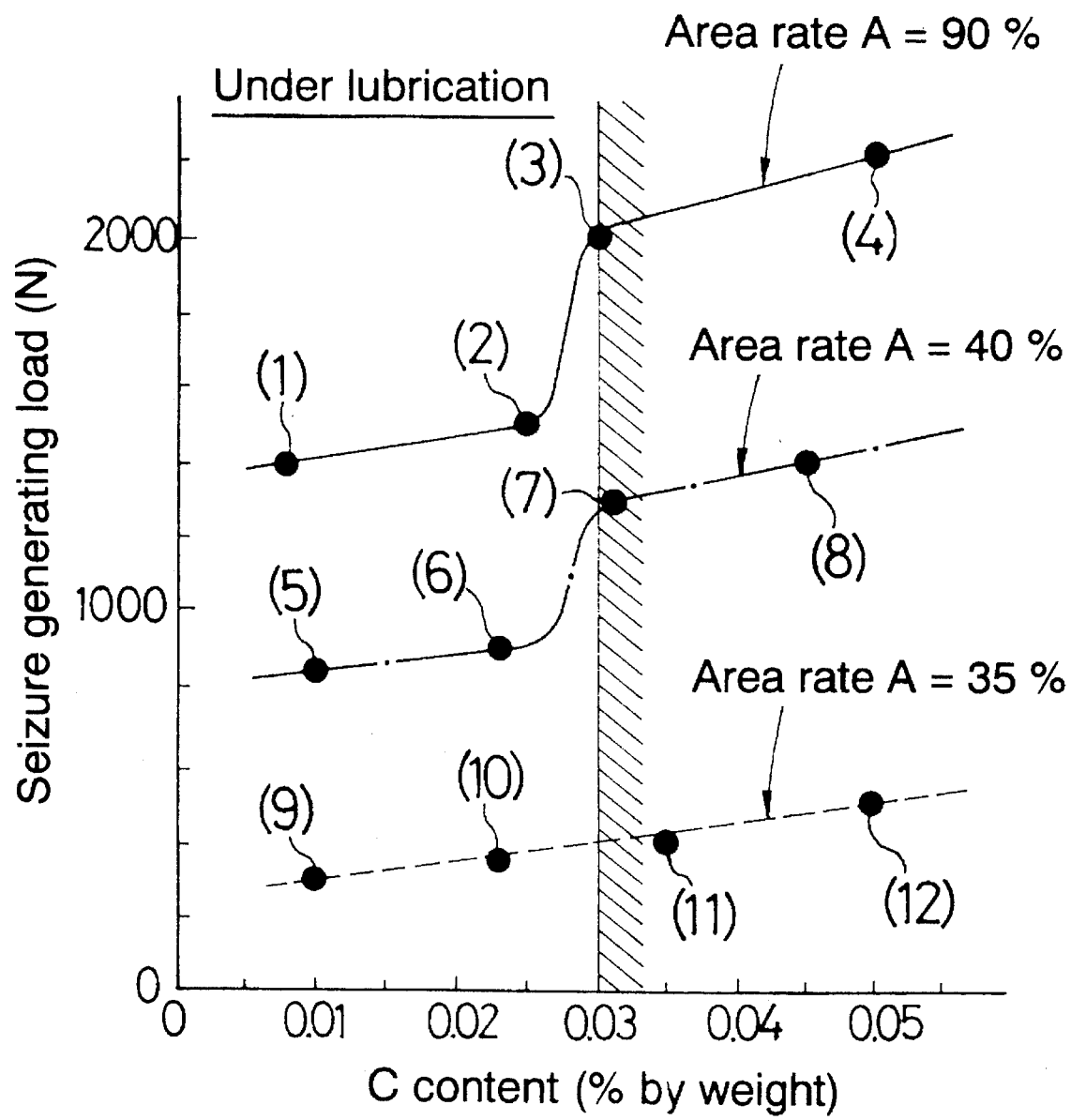
FIG. 11 is a graph illustrating the relationship between the C content and the seizure generating load.

FIG. 11 illustrates the relationship between the C content, the area rate A of trigonal or hexagonal pyramid-shaped Fe crystals and the seizure generating load for the examples 1 to 12. In FIG. 11, the points (1) to (12) correspond to the examples 1 to 12, respectively.

If the examples 1 to 4 are compared with one another in FIG. 11, they have the same area rate of the hexagonal pyramid-shaped Fe crystals and initially have the equivalent oil retention. However, in the examples 3 and 4, the C content is equal to or greater than 0.03% by weight, and the hardness is higher than those in the examples 1 and 2. Therefore, the examples 3 and 4 exhibit an excellent wear resistance and hence, the oil retention is maintained. As a result, each of the examples 3 and 4 has a seizure resistance superior to the examples 1 and 2. The same is true between the examples 7 and 8 and the examples 5 and 6.

The area rate A of each of the examples 1 to 4 is substantially higher than those of the examples 5 to 8 and hence, there is a large difference in oil retention between the examples 1 to 4 and the examples 5 to 8. Consequently, the seizure resistance of the examples 1 to 4 is superior to the examples 5 to 8.

The examples 9 and 10 are lower in oil retention and hardness, and the examples 11 and 12 are higher in hardness, but lower in oil retention. As a result, the seizure resistance of each of the examples 9 to 12 is substantially reduced.

The examples 3, 4, 7 and 8 are also applicable to a journal portion or the like for the base material for a cam shaft of a cast iron (JIS FC250).

Second embodiment

Each of examples 1 to 12 of Fe-plated layers corresponding to the examples 1 to 12 of the slide surface constructions in the first embodiment was formed on a disk of steel (JIS SCM420) in the same manner as described above. They were subjected to a sliding test in a chip-on-disk manner under non-lubrication to measure the friction coefficient μ, thereby providing results given in Table 5. Conditions for the test are as follows: the rotational speed of a disk was 1 m/sec; the material for a chip was Al-10% by weight of Si; the load was 150N (constant); and the area of the slide surface of the chip was 1 cm$^2$.

TABLE 5

| Fe-plated layer | Friction coefficient μ |
|---|---|
| Example No. 1 | 0.08 |
| Example No. 2 | 0.12 |
| Example No. 3 | 0.20 |
| Example No. 4 | 0.23 |
| Example No. 5 | 0.10 |
| Example No. 6 | 0.12 |
| Example No. 7 | 0.18 |
| Example No. 8 | 0.20 |
| Example No. 9 | 0.15 |
| Example No. 10 | 0.16 |
| Example No. 11 | 0.17 |
| Example No. 12 | 0.18 |

Figure 12:
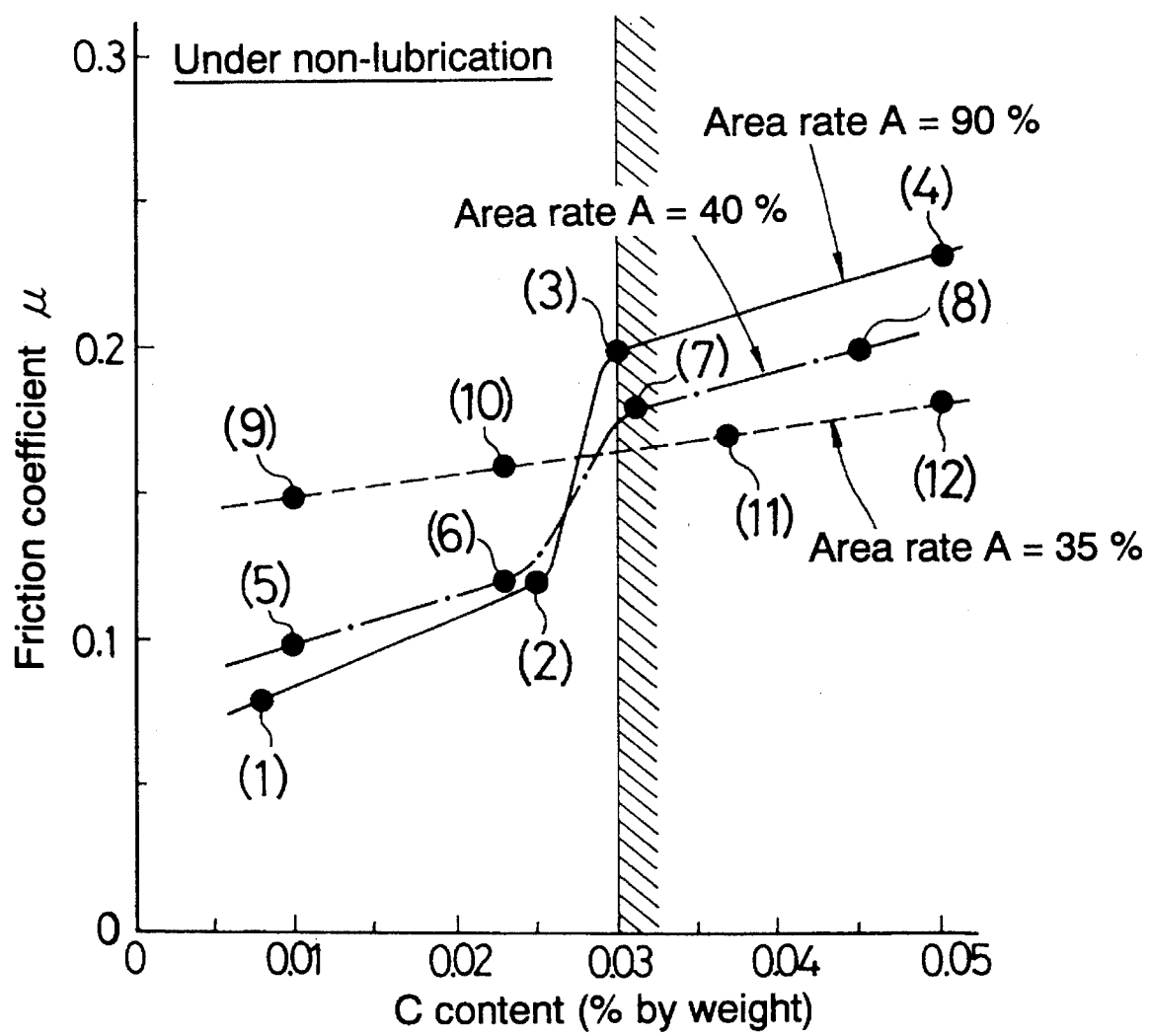
FIG. 12 is a graph illustrating the relationship between the C content and the friction coefficient.

FIG. 12 illustrates the relationship between the C content, the area rate A of trigonal or hexagonal pyramid-shaped Fe crystals and the friction coefficient for the examples 1 to 12. In FIG. 12, the points (1) to (12) correspond to the examples 1 to 12, respectively.

If the examples 1 to 4 are compared with one another in FIG. 12, they have the same area rate A of the hexagonal pyramid-shaped Fe crystals and a substantially equivalent load per unit area. However, in the examples 3 and 4, the C content is equal to or greater than 0.03% by weight, and the hardness is higher than those of the examples 1 and 2. Therefore, each of the examples 3 and 4 has a wear resistance superior to the examples 1 and 2. As a result, a large number of the hexagonal pyramid-shaped Fe crystals in the examples 3 and 4 exhibit a biting effect to the chip and hence, the friction coefficient μ is higher than those of the examples 1 and 2. The same is true between the examples 7 and 8 and the examples 5 and 6.

With regard to the relationship between the examples 3 and 4 and the examples 7 and 8, the area rate A in the examples 3 and 4 is substantially higher than that in the examples 7 and 8. Therefore, the friction coefficient in the examples 3 and 4 is higher due to the magnitude of the biting effect, as compared with the examples 7 and 8.

In a range of C<0.03% by weight including the examples 1 and 2 and the examples 5 and 6, trigonal pyramid-shaped Fe crystals are liable to be formed to incline, as compared with hexagonal pyramid-shaped Fe crystals. Due to this, in the example having an area rate of 40%, a local abutment portion is produced, resulting in a tendency for the friction coefficient μ to be higher than that of the example having an area rate A of 90% which produces an equivalent friction.

For the examples 9 to 12, the biting effect is extremely small because the area rate A is lower than 40%. Therefore, although the biting effect is extremely small, the friction coefficient μ is relatively increased with an increase in hardness. But still, the friction coefficient μ is low, as compared with the examples 3, 4, 7 and 8.

The examples 3, 4, 7 and 8 have the relatively large biting effect, as described above. Therefore, if the example 3, 4, 7, 8 or the like is formed on a bolt seating surface, the hard trigonal or hexagonal pyramid-shaped Fe crystals in those examples will bite into a surface of an opposed member, thereby preventing a loosing of a bolt.

Third embodiment

Figure 13:
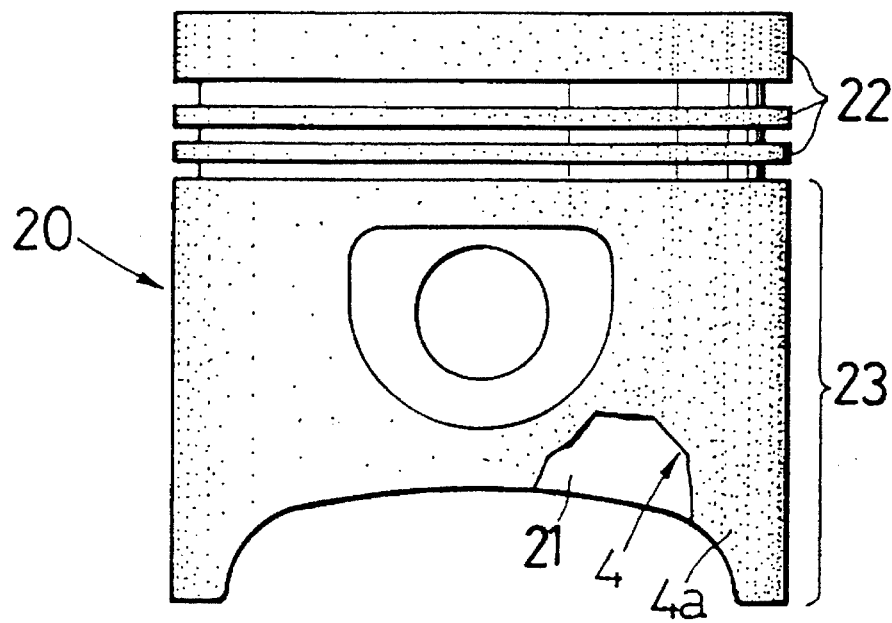
FIG. 13 is a broken front view of an essential portion of a piston.

Referring to FIG. 13, a piston 20 for an internal combustion engine has a piston body 21 of aluminum alloy, and a stratified slide surface construction 4 formed on an outer periphery 3 of each of a land portion 22 and a skirt portion 23 of the piston body 21 by an electrical plating.

The slide surface construction 4 is formed of an aggregate of metal crystals as in the first embodiment. The crystal structure is the same as that in the first embodiment.

Even in this case, the area rate A of pyramid-shaped metal crystals such as hexagonal and trigonal pyramid-shaped metal crystals and small pyramid-shaped metal crystals in the slide surface 4a is set in a range of A≧40% (including A=100%).

The aggregate contains hydrogen (H) which is an added element. The content of hydrogen in the aggregate is set in a range of H≧0.01% by weight. If the H content is set in this manner, it is possible to increase the hardness of the hexagonal pyramid-shaped metal crystals 6 or the like and to allow at least a portion of the hydrogen to exist in the hexagonal pyramid-shaped metal crystals 6 or the like.

In such a slide surface construction 4, when a mating member is slid on the slide surface, a plastic deformation of a tip end portion of the hexagonal pyramid-shaped metal crystals 6 or the like is avoided, and due to a brittleness resulting from the inclusion of the hydrogen, the tip end portion of the hexagonal pyramid-shaped metal crystals 6 or the like is sheared and worn in a direction intersecting a direction of height thereof. As a result, an oil retention by the valley portions 8 is insured, and a surface-surface sliding is produced. Therefore, the friction coefficient is reduced and thus, the slide surface construction 4 exhibits an excellent sliding characteristic.

Figure 14:
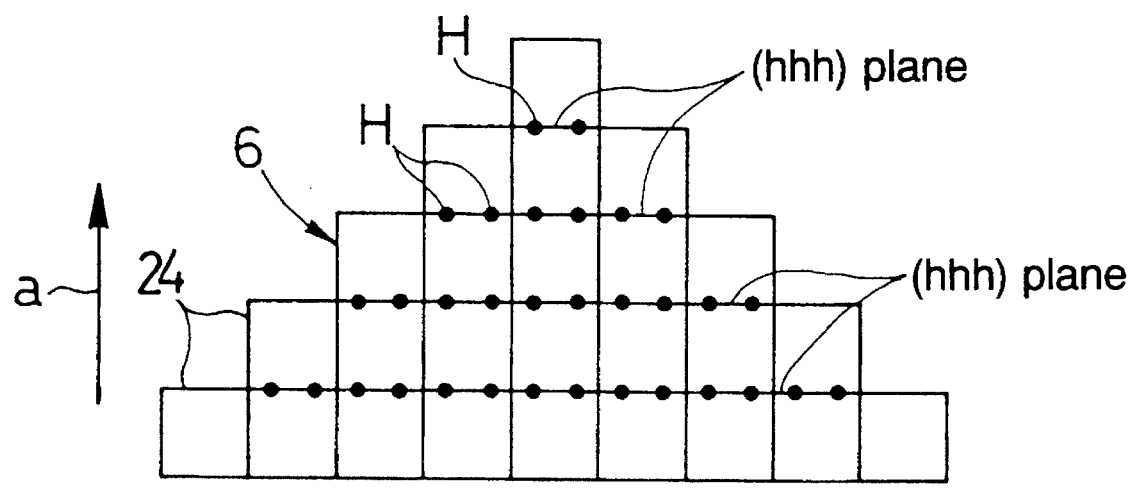
FIG. 14 is a model diagram of a pyramid-shaped metal crystal.
Figure 15:
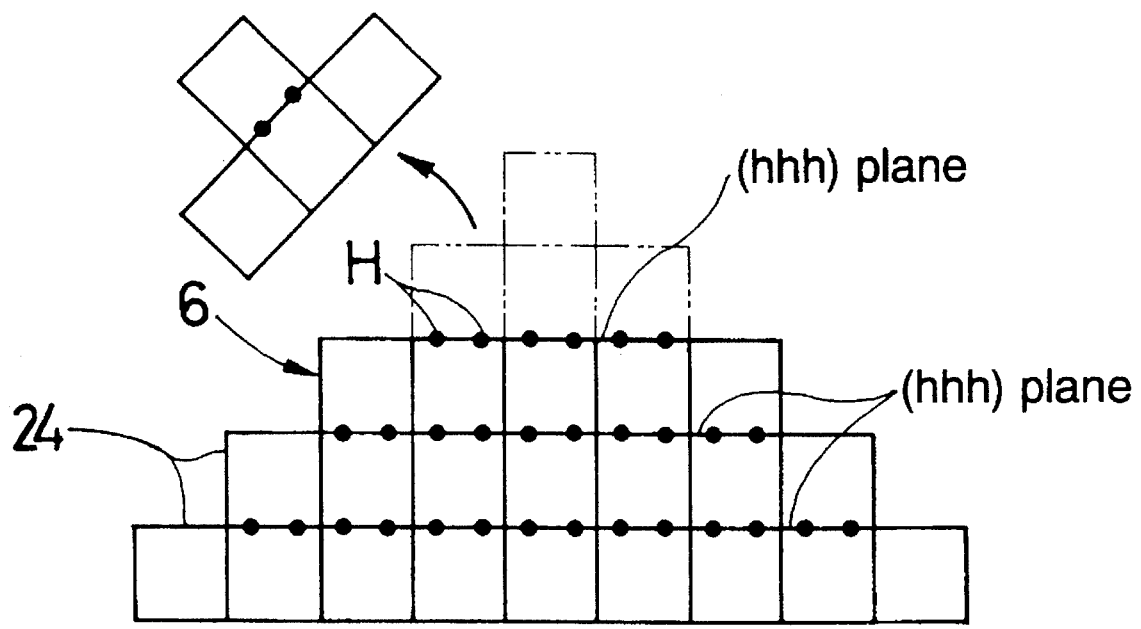
FIG. 15 is a model diagram for explaining the wear of the pyramid-shaped metal crystals.

As one of reasons why a shearing as described above is performed, the following phenomenon can be presumed from a photomicrograph showing the crystal structure of a vertical section of the slide surface construction after a sliding test. For example, the hexagonal pyramid-shaped metal crystal 6 has a structure in which a large number of cubic lattices 24 are superposed one on another, as shown in FIG. 14. And at least a portion of hydrogen H is present in a crystal plane, i.e., (hhh)plane, which intersects (at right angles in the embodiment) with the height direction (arrow "a") within the hexagonal pyramid-shaped metal crystal 6. Thus, it is believed that when a mating member is slid on the slide surface, the tip end portion of the hexagonal pyramid-shaped metal crystal 6 is sheared at a predetermined (hhh) plane, as shown in FIG. 15. In this case, the (hhh) plane is a crystal plane with a high surface energy and for this reason, a smooth plane produced by shearing has a good wettability to an oil and thus, an oil film is immediately formed on the slide surface 4a after being worn.

Plating bath conditions for electrical Fe-plating for forming the slide surface construction are as given in Table 6.

TABLE 6

| Plating bath | | |
|---|---|---|
| Ferrous sulfate (g/liter) | pH | Temperature (°C.) |
| 100–400 | 5–7 | 10–60 |

For energization, a pulse current process is mainly utilized, and conditions therefor are the same as in the first embodiment. The H content is controlled mainly by changing the temperature of a plating bath. In this case, the content of H in the slide surface construction 4 is extremely small and hence, in order to accurately control the H content, a replenisher adjusted to the same composition and the same temperature as the plating bath is supplied in a predetermined amount between the anode and the cathode during the electrical Fe-plating. If this supplying is not conducted, the plating bath located between the anode and the cathode is heated, resulting in a dispersion in temperature and for this reason, it is difficult to control the H content in the slide surface construction 4.

In addition to the electric plating, a gas-phase plating process may be utilized as in the first embodiment. In this gas-phase plating process, carbon can be incorporated into the aggregate by forcing hydrogen to flow through a chamber.

Particular examples will be described below.

A plurality of pistons 20 for an internal combustion engine were produced by subjecting an outer periphery of each of a land portion 22 and a skirt portion 23 of a piston body 21 of aluminum alloy to an electrical Fe-plating to form a slide surface construction 4 formed of an aggregate of Fe crystals and having a thickness of 15 μm.

Table 7 shows conditions for the electrical Fe-plating to form each of examples 1 to 15 of the slide surface constructions. The plating time was varied within a range of 10 to 60 minutes in order to set the thickness of the examples at 15 μm, as described above. The amount of replenisher supplied was set at 0.5 liters/min.

TABLE 7

| Slide surface construction | Plating bath | | | Pulse current process | | | |
|---|---|---|---|---|---|---|---|
| | Ferrous sulfate (g/liter) | pH | Temperature (°C.) | CDmax (A/dm$^2$) | CDm (A/dm$^2$) | $T_{ON}/T_C$ | $T_{ON}$ (msec) |
| Example No. 1 | 400 | 6 | 50 | 20 | 4 | 0.2 | 2 |
| Example No. 2 | 400 | 6 | 48 | 20 | 4 | 0.2 | 2 |
| Example No. 3 | 400 | 6 | 45 | 20 | 4 | 0.2 | 2 |
| Example No. 4 | 400 | 6.2 | 45 | 20 | 4 | 0.2 | 2 |
| Example No. 5 | 400 | 6.2 | 40 | 20 | 4 | 0.2 | 2 |
| Example No. 6 | 400 | 6 | 48 | 20 | 4 | 0.2 | 10 |
| Example No. 7 | 400 | 6 | 45 | 20 | 4 | 0.2 | 10 |
| Example No. 8 | 400 | 6.2 | 40 | 20 | 4 | 0.2 | 10 |
| Example No. 9 | 200 | 6 | 50 | 15 | 3 | 0.2 | 2 |
| Example No. 10 | 200 | 6 | 48 | 15 | 3 | 0.2 | 2 |
| Example No. 11 | 200 | 6 | 45 | 15 | 3 | 0.2 | 2 |
| Example No. 12 | 200 | 6.2 | 40 | 15 | 3 | 0.2 | 2 |
| Example No. 13 | 100 | 6 | 50 | 17.5 | 3.5 | 0.2 | 2 |
| Example No. 14 | 100 | 6 | 45 | 17.5 | 3.5 | 0.2 | 2 |
| Example No. 15 | 100 | 6.2 | 40 | 17.5 | 3.5 | 0.2 | 2 |

Table 8 shows the crystal form of the slide surface, the area rate A, the grain size of trigonal or hexagonal pyramid-shaped Fe crystals in the slide surface, the presence rate S of the oriented Fe crystals, the H content and the hardness in a vertical section of the slide surface construction.

Figure 18:
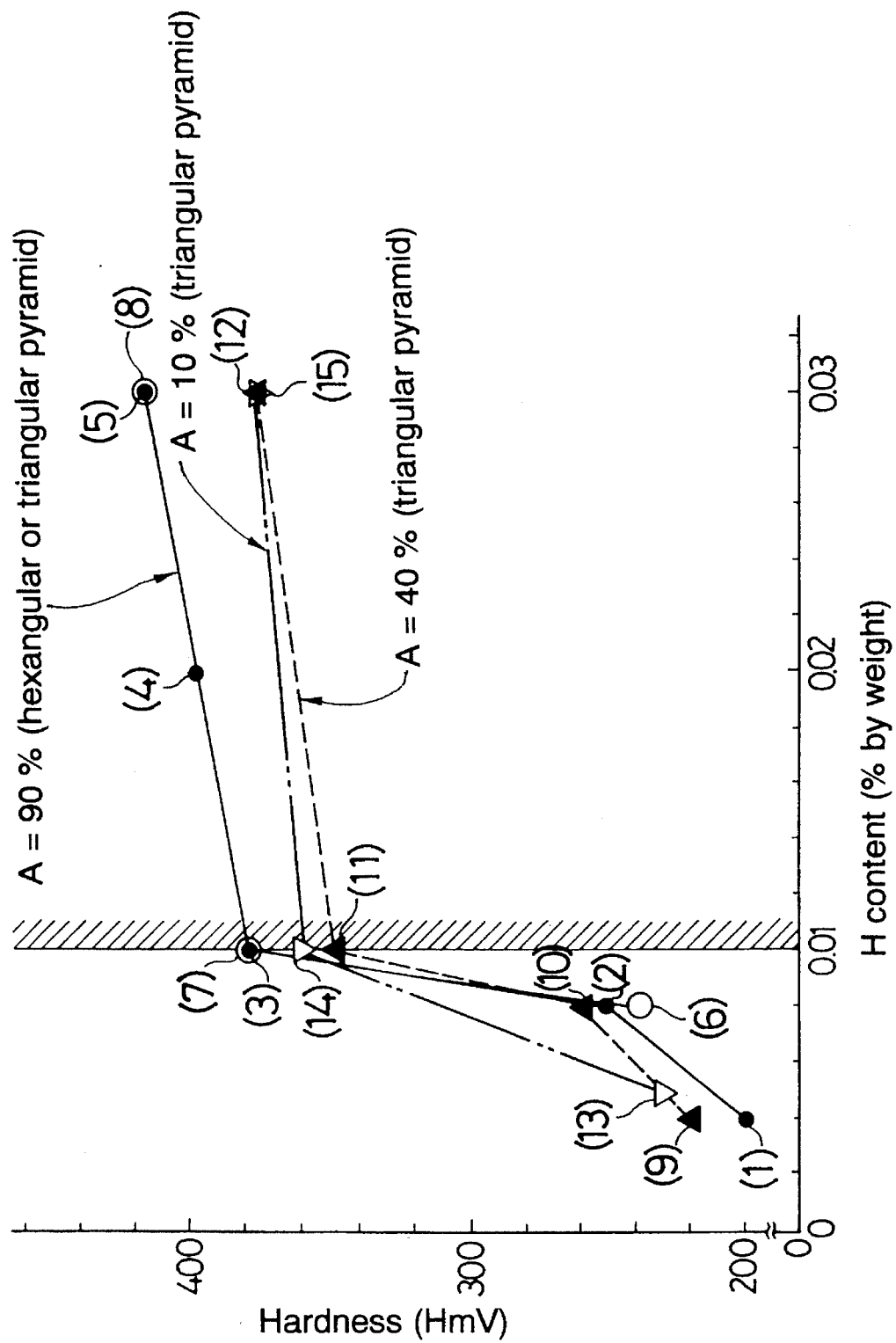
FIG. 18 is a graph illustrating the relationship between the H content and the hardness.

FIG. 18 is a graph illustrating the relationship between the H content and hardness in the examples 1 to 15. In FIG. 18, the points (1) to (15) correspond to the examples 1 to 15, respectively. It can be seen from FIG. 18 that if the H content

TABLE 8

| Slide surface construction | Crystal form of slide surface | Hexagonal or triagonal pyramid-shaped Fe crystal | | Presence rate S of oriented Fe crystal (%) | | | | | H content (% by weight) | Hardness HmV |
|---|---|---|---|---|---|---|---|---|---|---|
| | | Area rate (%) | Grain size (μm) | {110} | {200} | {211} | {310} | {222} | | |
| Example No. 1 | Hexagonal pyramid | 90 | 1–4 | 0.7 | 2 | 5.1 | 0.8 | 91.4 | 0.004 | 200 |
| Example No. 2 | Hexagonal pyramid | 90 | 1–4 | 0.9 | 2.1 | 5.5 | 1 | 90.5 | 0.008 | 250 |
| Example No. 3 | Hexagonal pyramid | 90 | 1–3 | 0.5 | 1.8 | 6.1 | 0.8 | 90.8 | 0.01 | 380 |
| Example No. 4 | Hexagonal pyramid | 90 | 1–3 | 0.5 | 12.5 | 6.3 | 0.6 | 91.1 | 0.02 | 400 |
| Example No. 5 | Hexagonal pyramid | 90 | 1–3 | 0.7 | 1.1 | 6.8 | 0.5 | 90.9 | 0.03 | 420 |
| Example No. 6 | Trigonal pyramid | 90 | 1–5 | 1.1 | 2 | 4.4 | 2.5 | 90 | 0.008 | 240 |
| Example No. 7 | Trigonal pyramid | 90 | 1–5 | 1.5 | 2.3 | 4 | 2.4 | 89.8 | 0.01 | 380 |
| Example No. 8 | Trigonal pyramid | 90 | 1–5 | 1.4 | 2.2 | 3.7 | 2.4 | 90.3 | 0.03 | 420 |
| Example No. 9 | Trigonal pyramid | 40 | 0.5–5 | 18 | 10.1 | 18.7 | 11.5 | 41.7 | 0.004 | 220 |
| Example No. 10 | Trigonal pyramid | 40 | 0.5–5 | 19.4 | 11.3 | 18 | 10.8 | 40.5 | 0.008 | 260 |
| Example No. 11 | Trigonal pyramid | 40 | 0.5–5 | 17.8 | 10.5 | 20.7 | 10.6 | 40.4 | 0.01 | 350 |
| Example No. 12 | Trigonal pyramid | 40 | 0.5–5 | 15.6 | 9.8 | 22.2 | 10.1 | 42.3 | 0.03 | 380 |
| Example No. 13 | Granular Trigonal pyramid | — 10 | — 0.5–8 | 19.4 | 12.4 | 19.7 | 13 | 35.5 | 0.005 | 230 |
| Example No. 14 | Granular Trigonal pyramid | — 10 | — 0.5–6 | 18.8 | 11.6 | 19.9 | 14.9 | 34.8 | 0.01 | 360 |
| Example No. 15 | Granular Trigonal pyramid | — 10 | — 0.5–6 | 19.8 | 11.7 | 19.6 | 13.8 | 35.1 | 0.03 | 380 |

The methods for determining the area rate A, the grain size and the presence rate S of the trigonal or hexagonal pyramid-shaped Fe crystals are the same as in the first embodiment. The measurement of the H content was carried out by peeling off each of the examples 1 to 15 from the base material 2 and then analyzing each of the examples 1 to 15 by melting them in an inert gas melting and conducting a thermal conduction process (JIS Z2614). The H content in Table 8 is a value in the aggregate, i.e., in the entire slide surface construction.

Figure 16:
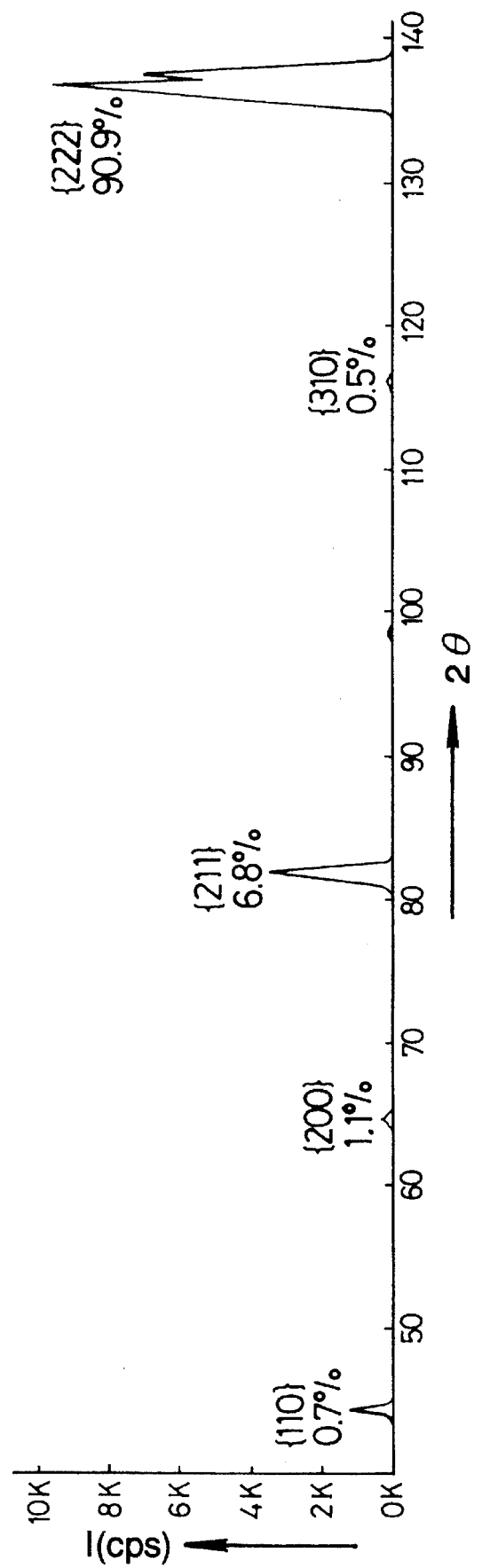
FIG. 16 is an X-ray diffraction pattern for the pyramid-shaped metal crystals.
Figure 17:
FIG. 17 is a photomicrograph showing the crystal structure of a slide surface.

FIG. 16 is an X-ray diffraction pattern of the example 5. FIG. 17 is a photomicrograph showing the crystal structure of the slide surface in the example 5, wherein a large number of hexagonal pyramid-shaped Fe crystals are observed. In this case, the area rate A of the hexagonal pyramid-shaped Fe crystals is 90%, as given in Table 8. The hexagonal pyramid-shaped Fe crystal is a {222} oriented Fe crystal with its (hhh) plane, i.e., {222} plane oriented toward the slide surface. The presence rate S of the {222} oriented Fe crystals is 90.9%, as shown in Table 8 and FIG. 16.

is set in a range of H≧0.01% by weight, the hardness is abruptly increased.

Disks having the examples 1 to 15 were fabricated and subjected to a sliding test in a chip-on-disk manner under lubrication to measure a friction coefficient μ of each of the examples, thereby providing results given in Table 9. Conditions for the test are as follows: the material of the disk is JIS FC250; the material of the chip is an Al-10% by weight of Si alloy; the rotational speed of the disk was 15 m/sec; the amount of oil supplied was 40 cc/min; the area of the slide surface of the chip was 2 cm$^2$; and the pressure on the chip was 10 MPa.

TABLE 9

| Slide surface construction | Friction coefficient μ | Slide surface construction | Friction coefficient μ |
|---|---|---|---|
| Example No. 1 | 0.011 | Example No. 9 | 0.013 |
| Example No. 2 | 0.010 | Example No. 10 | 0.012 |
| Example No. 3 | 0.006 | Example No. 11 | 0.008 |

TABLE 9-continued

| Slide surface construction | Friction coefficient μ | Slide surface construction | Friction coefficient μ |
| --- | --- | --- | --- |
| Example No. 4 | 0.005 | Example No. 12 | 0.007 |
| Example No. 5 | 0.005 | Example No. 13 | 0.015 |
| Example No. 6 | 0.011 | Example No. 14 | 0.015 |
| Example No. 7 | 0.007 | Example No. 15 | 0.015 |
| Example No. 8 | 0.006 | | |

Figure 19:
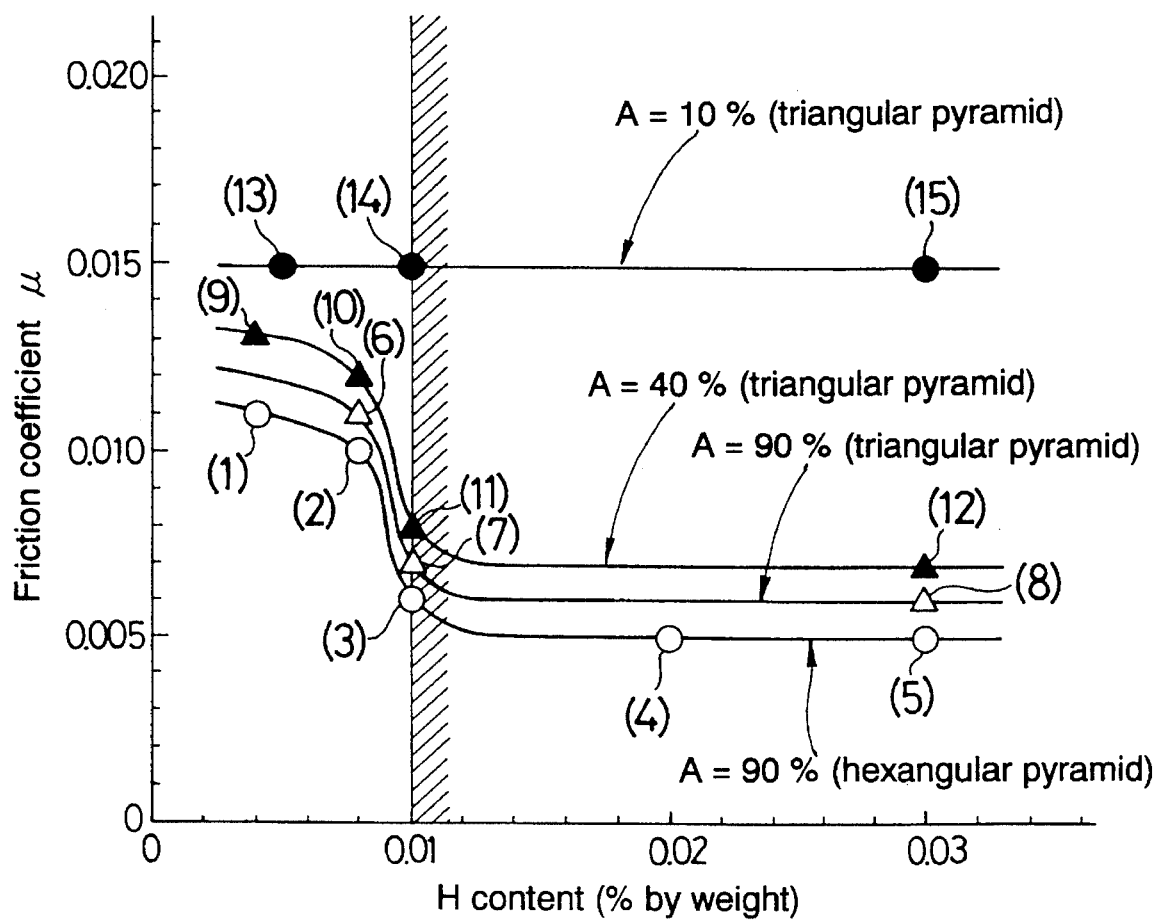
FIG. 19 is a graph illustrating the relationship between the H content and the friction coefficient.

FIG. 19 illustrates the relationship between the H content, the area rate A of trigonal or hexagonal pyramid-shaped Fe crystals, and the friction coefficient μ for the examples 1 to 15. In FIG. 19, the points (1) to (15) correspond to the examples 1 to 15, respectively.

Figure 20:
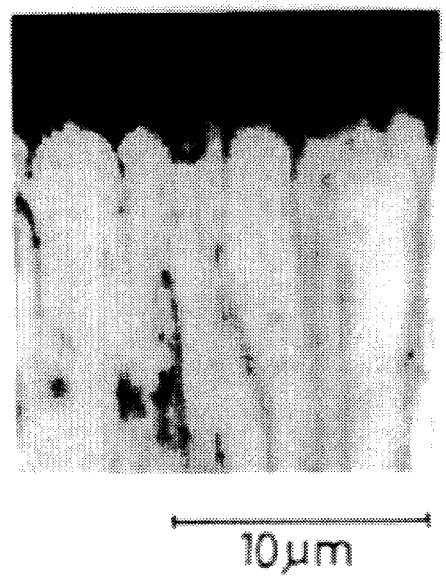
FIG. 20 is a photomicrograph showing the crystal structure of a vertical section in one example of the slide surface construction after a sliding test.
Figure 21:
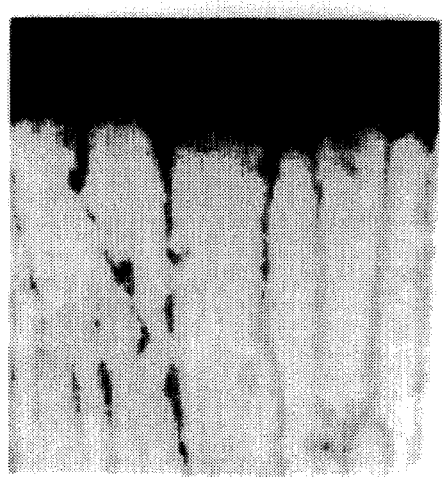
FIG. 21 is a photomicrograph showing the crystal structure of a vertical section in another example of the slide surface construction after the sliding test.

FIG. 20 is a photomicrograph showing the crystal structure of the vertical section of the example 1 after the sliding test, and FIG. 21 is a photomicrograph showing the crystal structure of the vertical section of the example 5 after the sliding test.

Each of the examples 3 to 5, 7, 8, 11 and 12 has an area rate A of the trigonal or hexagonal pyramid-shaped Fe crystals set in a range of A≧40% and H content set in a range of H≧0.01% by weight. As apparent from FIG. 19, the friction coefficient μ of these examples 3 to 5, 7, 8, 11 and 12 are reduced as compared with the other examples.

This is due to the fact that a plastic deformation of the tip end portion of each of the hexagonal pyramid-shaped Fe crystals is avoided, and that the tip end portion assumes a trapezoidal shape as a result of being sheared and worn at the {222} plane, i.e., a surface-surface sliding is produced, as shown in FIG. 21 for the typical example 5. For the example 1, the tip end portion of each of the hexagonal pyramid-shaped Fe crystals has an indented shape, as a result of being plastically deformed and worn so that it is torn off, as shown in FIG. 20.

The effect of reducing the friction coefficient μ in the examples 3 to 5 having the hexagonal pyramid-shaped Fe crystals is larger in the same area rate A and the same H content, as compared with the examples 7 and 8 having the trigonal pyramid-shaped Fe crystals. Therefore, from the viewpoint of an improvement in sliding characteristic, it is desirable that the slide surface is formed of the hexagonal Fe crystals. For the examples 13 to 15, the area rate A of the trigonal pyramid-shaped Fe crystals is lower than 40% by weight, and the sliding resistance is higher. For this reason, the friction coefficient μ is high, as compared with the other examples, and is substantially constant, irrespective of the H content. A sliding situation as described above is similar even under non-lubrication.

Figure 22:
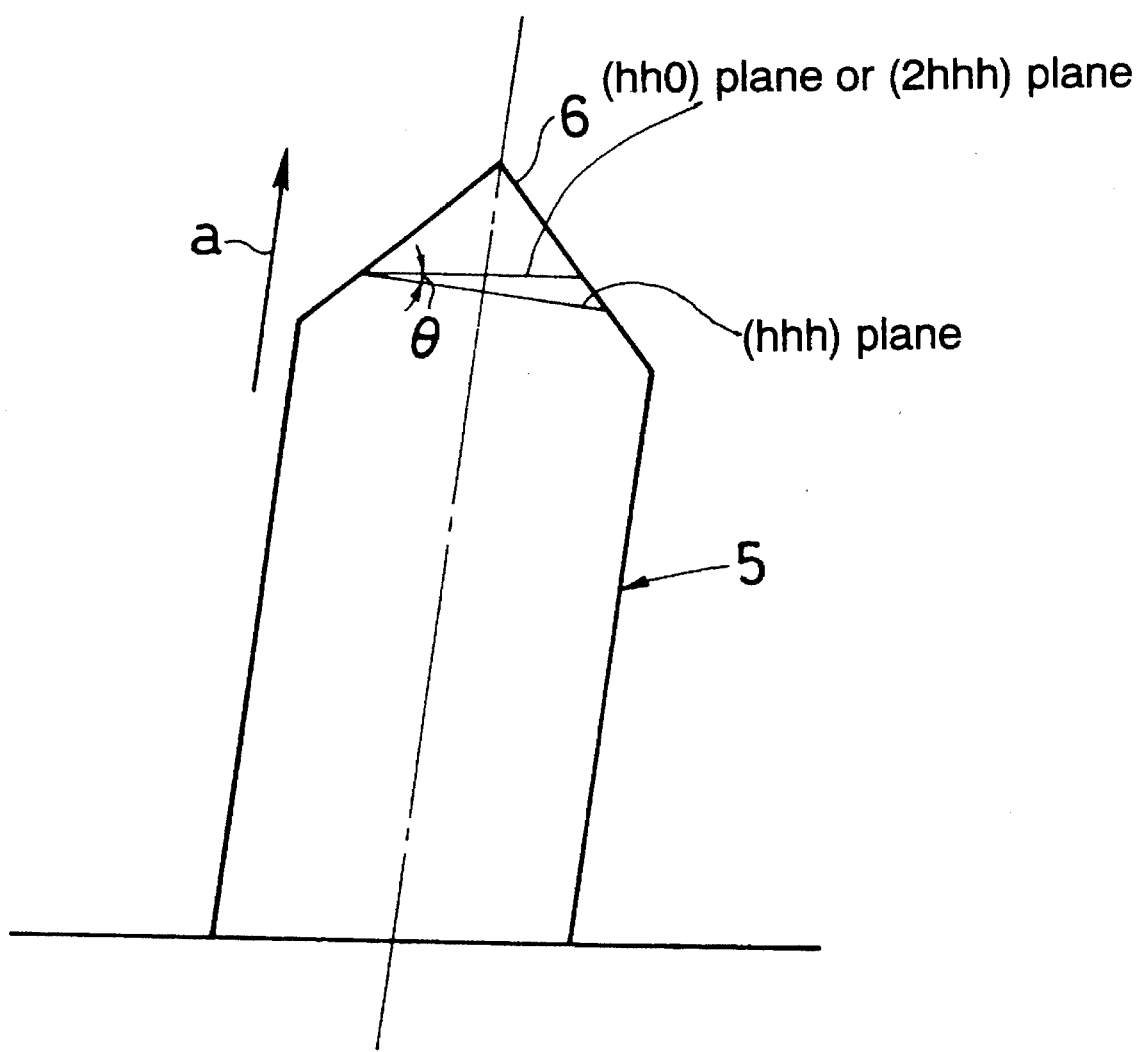
FIG. 22 is a diagram illustrating a columnar (hhh) oriented metal crystal having an inclination angle.

When a columnar metal crystal 5 is grown such that its (hhh) plane has an inclination θ, as shown in FIG. 22, it is presumed that the shearing is produced on a crystal plane which is in an obliquely intersecting relation to a direction (arrow "a") of the height thereof and which has an inclination θ with respect to an (hhh) plane, i.e., on an (hh0)plane or (2 hhh) plane.

It should be noted that the above-described slide surface construction is applicable not only to the piston, but also to various slide members such as a piston pin, a piston ring and the like.

Fourth embodiment

A slide surface construction 4 in this embodiment is formed in an outer periphery 3 of a round tubular base material 2 of steel by an electrical Fe-plating, as shown in FIG. 1, as in the first embodiment, thereby constituting a surface layer of a piston pin 1 for an internal combustion engine.

The slide surface construction 4 is formed of an aggregate of metal crystals having a body-centered cubic structure (a bcc structure) as in the first embodiment (see FIG. 2). The aggregate contains boron (B) which is an added element. The content of boron (B) in the aggregate is set in a range of B≧0.01% by weight.

Figure 23:
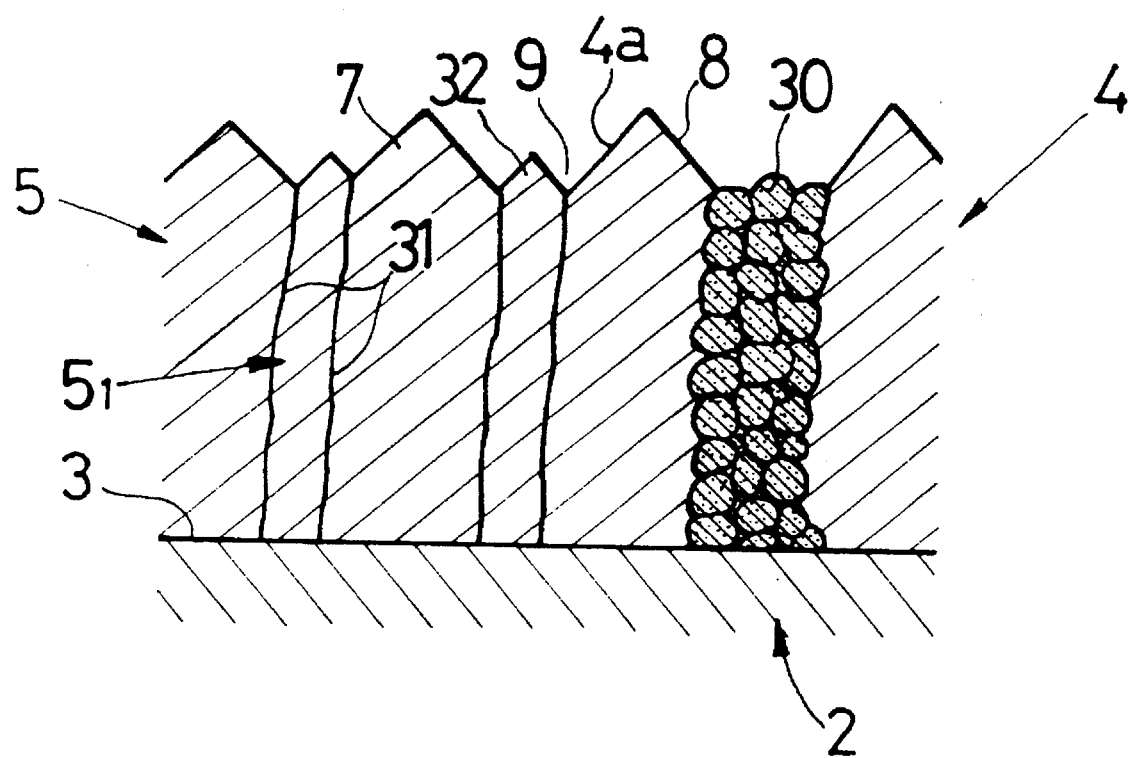
FIG. 23 is a vertical sectional view of an essential portion of a slide surface construction.

The aggregate includes a large number of two types of columnar metal crystals 5 and $5_1$ grown from the outer periphery of the base material 2, and a large number of granular metal crystals 30, as shown in FIG. 23.

If a particular amount of boron (B) is incorporated in the aggregate as described above, the boron is preferentially precipitated at a crystal grain boundary 31 between the adjacent columnar metal crystals 5 and $5_1$ or the like to reinforce the crystal grain boundary 31. The diametrical growth of the adjacent columnar metal crystals 5 and $5_1$ is inhibited by the preferential precipitation of the boron at the crystal grain boundary 31 and hence, these columnar metal crystals 5 and $5_1$ are finely divided, resulting in an increase in hardness of the slide surface construction 4. In this manner, an increase in strength of the slide surface construction 4 is achieved.

The area rate $A_1$ of the columnar metal crystals 5 and $5_1$, i.e., all the columnar metal crystals in a vertical section (see FIG. 23) of the slide surface construction 4 is set in a range of $A_1≧30\%$ (including $A_1=100\%$) in order to improve the heat conductivity of the slide surface construction 4.

The columnar metal crystals 5 and $5_1$ having the bcc structure include at least one of an (hhh) oriented metal crystal with its (hhh) plane (by Miller indices) oriented toward the slide surface 4a, a (2 hhh) oriented metal crystal with its (2 hhh) plane (by Miller indices) oriented toward the slide surface 4a, and an (h00) oriented metal crystal with its (h00) plane (by Miller indices) oriented toward the slide surface 4a.

Figure 24:
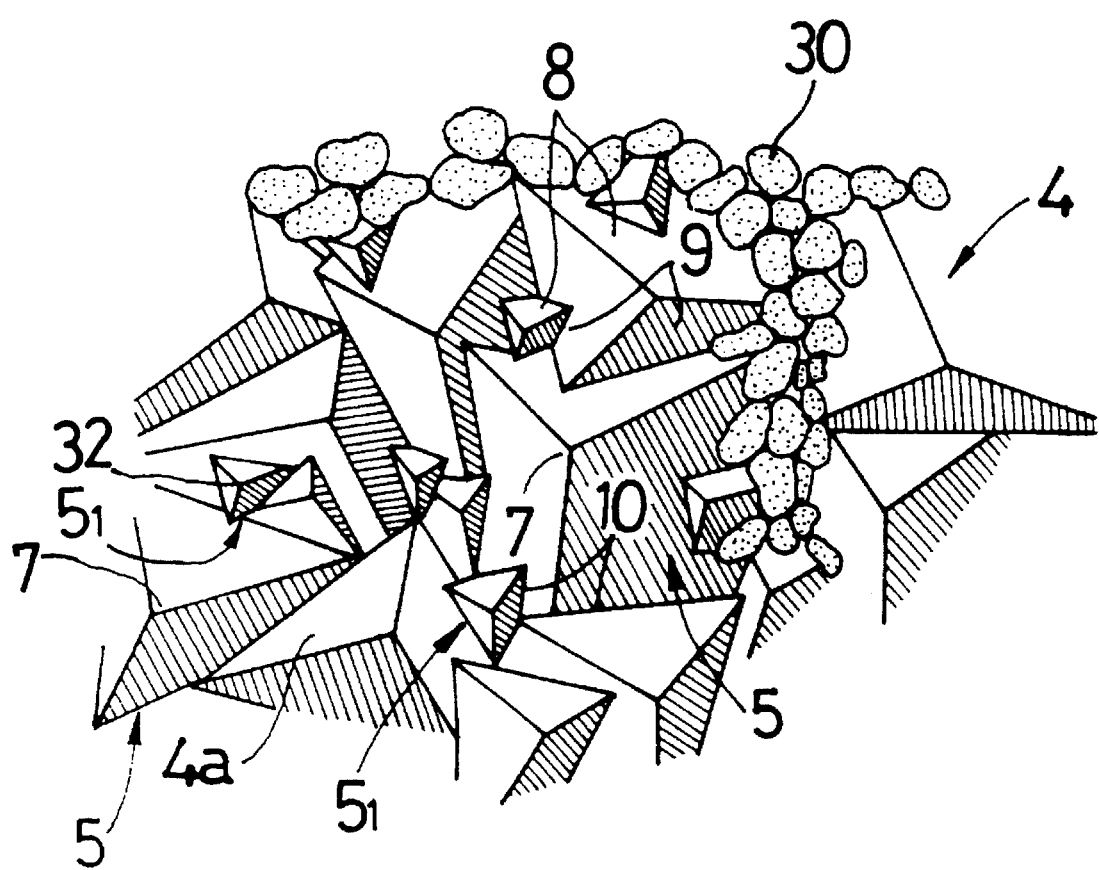
FIG. 24 is a plan view of the essential portion of the slide surface construction.

If one columnar metal crystal 5 is an (hhh) oriented Fe metal crystal, the tip end portion thereof can be formed into a trigonal pyramid-shaped metal crystal (or a hexagonal pyramid-shaped metal crystal 7) in the slide surface 4a, as shown in FIG. 24. If the other columnar metal crystal $5_1$ is a (2 hhh) oriented Fe metal crystal, the tip end portion thereof can be formed into a small pyramid-shaped metal crystal in the slide surface 4a as shown in FIG. 24, as described above. Further, if the columnar metal crystal is an (h00) oriented Fe metal crystal, the tip end portion thereof can be formed into a tetrangular pyramid-shaped metal crystal in the slide surface.

It is desirable that the area rate A of the trigonal pyramid-shaped metal crystal or the like in the slide surface 4a is equal to or greater than 40% (including A=100%). If the area rate A is set in this manner, for example, the adjacent trigonal pyramid-shaped metal crystals 7, as well as the trigonal pyramid-shaped metal crystal 7 and the small pyramid-shaped metal crystal 30, are in mutually biting states. Thus, a surface area of the slide surface 4a is enlarged and assumes a very intricate aspect including a large number of fine crest portions 8, a large number of fine valley portions 9 formed between the crests 8, and a a large number of fine swamps 10 formed due to the mutual biting of the crests 8.

For such a slide surface construction 4, the wear of each of the trigonal pyramid-shaped and small pyramid-shaped metal crystals 7 and 32 is inhibited by a hardness increasing effect thereof even in a severe sliding environment. Therefore, a good oil retention of the slide surface construction 4 is maintained under lubrication, while a sliding load is dispersed by an infinite number of trigonal pyramid-shaped and small pyramid-shaped metal crystals 7 and 32 under non-lubrication. Thus, the slide surface construction 4 exhibits an excellent seizure resistance under lubrication and under non-lubrication.

Further, a local increase in surface pressure can be avoided and the a fine division of the sliding load can be achieved, by the trigonal pyramid-shaped and small pyramid-shaped metal crystals 7 and 32. Thus, the slide surface construction 4 exhibits an excellent wear resistance not only under lubrication but also under non-lubrication.

The inclination angle θ of each of the (hhh) plane, the (2 hhh) plane and the (h00) plane with respect to a phantom plane 11 extending along the slide surface 4a is set in a range of $0° \leq θ \leq 15°$ (see FIG. 6).

Plating bath conditions for an electrical Fe-plating for forming the slide surface construction 4 are as given in Table 10.

TABLE 10

| Composition (g/liter) | | | | Temperature (°C.) |
|---|---|---|---|---|
| Ferrous sulfate | Boric sulfate | B-containing additive | pH | |
| 100–400 | 0–100 | ≦30 | 3–6.5 | 10–60 |

The B-containing additives which may be used include substances containing boron that are soluble in water, e.g., boric acid, ammonium borate and the like.

For energization, a pulse current process or a direct current process may be utilized. Conditions in the pulse current process are the same as in the first embodiment.

In the direct current process, the cathode current density CD is set in a range of $CD \leq 10$ A/dm². In addition, the content of boron (B) in the slide surface construction 4 is extremely small and hence, in order to accurately control the boron content and to uniformly disperse boron, a replenisher adjusted to the same composition and the same temperature as the plating bath is supplied in a predetermined amount between the anode and the cathode during the electrical Fe-plating. If this supplying is not carried out, a dispersion in concentration of the B-containing additive in the plating bath is produced and for this reason, it is difficult to control the content of boron in the slide surface construction 4.

In addition to the electrical plating, a gas-phase plating process may be utilized as in the first embodiment. For example, when W- or Mo-plating is carried out by a sputtering process under the same conditions as those described above, boron can be incorporated into the slide surface construction 4 by blowing hydrogen gas containing 5% of diborane ($B_2H_6$) onto the base material at 0.1 to 5 SCCM (cc/min). When a W-plating is carried out by a CVD process under the same conditions as those described above, boron can be incorporated into the slide surface construction 4 by forcing hydrogen gas containing 5% of diborane ($B_2H_6$) to flow into a chamber at 1 to 10 SCCM (cc/min).

Particular examples will be described below.

(I) A plurality of piston pins 1 for an internal combustion engine were produced by subjecting an outer peripheral surface 3 of a round tubular base material 2 of steel (JIS SCM420) to an electrical Fe-plating to form a slide surface construction 4 formed of an aggregate of Fe crystals and having a thickness of 20 μm.

Table 11 shows electrical Fe-plating conditions for examples 1 to 14 of the slide surface constructions, and FIG. 12 shows electrical Fe-plating conditions for examples 15 to 18 of the slide surface constructions. The plating time was varied in a range of 10 to 60 minutes in order to set the thickness of the examples 1 to 18 to 20 μm, as described above. The amount of replenisher supplied was set to 0.5 liters/min.

TABLE 11

| Slide surface construction | Plating bath | | | | | Pulse current process | | | |
|---|---|---|---|---|---|---|---|---|---|
| | Composition (g/liter) | | | | | | | | |
| | Ferrous sulfate | Boric acid | Ammonium sulfate | pH | Temperature (°C.) | CDmax (A/dm²) | CDm (A/dm²) | $T_{ON}/T_C$ | $T_{ON}$ (msec) |
| Example No. 1 | 200 | 0 | 0 | 6 | 50 | 15 | 3 | 0.2 | 2 |
| Example No. 2 | 200 | 1 | 0 | 6 | 50 | 15 | 3 | 0.2 | 2 |
| Example No. 3 | 200 | 1.5 | 0 | 6 | 50 | 15 | 3 | 0.2 | 2 |
| Example No. 4 | 200 | 3 | 0 | 6 | 50 | 15 | 3 | 0.2 | 2 |
| Example No. 5 | 200 | 1 | 10 | 4 | 50 | 15 | 3 | 0.2 | 2 |
| Example No. 6 | 200 | 1.5 | 10 | 4 | 50 | 15 | 3 | 0.2 | 2 |
| Example No. 7 | 100 | 0 | 0 | 6 | 50 | 17.5 | 3.5 | 0.2 | 2 |
| Example No. 8 | 100 | 1 | 0 | 6 | 50 | 17.5 | 3.5 | 0.2 | 2 |
| Example No. 9 | 100 | 1.5 | 0 | 6 | 50 | 17.5 | 3.5 | 0.2 | 2 |
| Example No. 10 | 100 | 3 | 0 | 6 | 50 | 17.5 | 3.5 | 0.2 | 2 |
| Example No. 11 | 100 | 0 | 0 | 6 | 50 | 15 | 3 | 0.2 | 2 |
| Example No. 12 | 100 | 1 | 0 | 6 | 50 | 15 | 3 | 0.2 | 2 |
| Example No. 13 | 100 | 1.5 | 0 | 6 | 50 | 15 | 3 | 0.2 | 2 |
| Example No. 14 | 100 | 3 | 0 | 6 | 50 | 15 | 3 | 0.2 | 2 |

TABLE 12

| Slide surface construction | Plating bath | | | | |
|---|---|---|---|---|---|
| | Composition (g/liter) | | | Temperature (°C.) | D.C. process CD (A/dm$^2$) |
| | Ferrous sulfate | Boric acid | pH | | |
| Example No. 15 | 250 | 0 | 6 | 50 | 4 |
| Example No. 16 | 250 | 1 | 6 | 50 | 4 |
| Example No. 17 | 250 | 1.5 | 6 | 50 | 4 |
| Example No. 18 | 250 | 3 | 6 | 50 | 4 |

Table 13 shows the crystal form of the slide surface, the area rate $A_1$ and grain size of columnar Fe crystals in a vertical section, the presence rate S of oriented Fe crystals, the B content and the hardness in the vertical section for the examples 1 to 18.

TABLE 13

| Slide surface construction | Crystal form of slide surface | Columnar Fe crystal | | Presence rate S of oriented Fe crystal (%) | | | | | B content (% by weight) | Hardness HmV |
|---|---|---|---|---|---|---|---|---|---|---|
| | | Area rate $A_1$ (%) | Grain size (μm) | {110} | {200} | {211} | {310} | {222} | | |
| Example No. 1 | Trigonal pyramid Small pyramid | 60 | 0.5–5 | 20 | 7 | 22 | 11 | 40 | 0.001 | 200 |
| Example No. 2 | Trigonal pyramid Small pyramid | 60 | 0.5–5 | 19 | 6 | 24 | 10 | 41 | 0.008 | 240 |
| Example No. 3 | Trigonal pyramid Small pyramid | 60 | 0.5–4 | 14 | 6 | 30 | 12 | 38 | 0.01 | 400 |
| Example No. 4 | Trigonal pyramid Small pyramid | 60 | 0.5–3 | 10 | 7 | 40 | 9 | 34 | 0.03 | 500 |
| Example No. 5 | Plate-like | 60 | 0.5–5 | 55 | 15 | 10 | 12 | 8 | 0.008 | 200 |
| Example No. 6 | Plate-like | 60 | 0.5–4 | 58 | 14 | 12 | 10 | 6 | 0.01 | 400 |
| Example No. 7 | Trigonal pyramid Small pyramid | 40 | 0.5–5 | 18 | 11 | 21 | 17 | 33 | 0.001 | 210 |
| Example No. 8 | Trigonal pyramid Small pyramid | 40 | 0.5–5 | 16 | 12 | 23 | 15 | 34 | 0.008 | 240 |
| Example No. 9 | Trigonal pyramid Small pyramid | 40 | 0.5–4 | 13 | 12 | 28 | 16 | 31 | 0.01 | 410 |
| Example No. 10 | Trigonal pyramid Small pyramid | 40 | 0.5–3 | 11 | 13 | 33 | 15 | 28 | 0.03 | 510 |
| Example No. 11 | Trigonal pyramid Small pyramid | 30 | 0.5–5 | 15 | 14 | 23 | 18 | 30 | 0.001 | 200 |
| Example No. 12 | Trigonal pyramid Small pyramid | 30 | 0.5–5 | 13 | 15 | 25 | 17 | 30 | 0.008 | 250 |
| Example No. 13 | Trigonal pyramid Small pyramid | 30 | 0.5–4 | 13 | 14 | 28 | 18 | 27 | 0.01 | 400 |
| Example No. 14 | Trigonal pyramid Small pyramid | 30 | 0.5–3 | 15 | 15 | 30 | 17 | 23 | 0.03 | 520 |
| Example | Granular | 5 | 0.5–1 | 11 | 25 | 20 | 23 | 21 | 0.001 | 280 |

TABLE 13-continued

| Slide surface construction | Crystal form of slide surface | Columnar Fe crystal Area rate $A_1$ (%) | Columnar Fe crystal Grain size (μm) | Presence rate S of oriented Fe crystal (%) {110} | {200} | {211} | {310} | {222} | B content (% by weight) | Hardness HmV |
|---|---|---|---|---|---|---|---|---|---|---|
| Example No. 15 | Pyramid Granular Pyramid | — 5 | 0.5–1 | 10 | 26 | 20 | 22 | 22 | 0.008 | 320 |
| Example No. 16 | Pyramid Granular Pyramid | — 5 | 0.5–1 | 11 | 24 | 21 | 24 | 20 | 0.01 | 410 |
| Example No. 17 | Pyramid Granular Pyramid | — 5 | 0.5–1 | 10 | 25 | 20 | 22 | 23 | 0.03 | 530 |
| Example No. 18 | | | | | | | | | | |

Methods for determining the area rate A and presence rate S of the trigonal pyramid-shaped Fe crystals are the same as in the first embodiment. The area rate $A_1$ was determined according to an expression of $A_1=(e/d)\times100$ (%) wherein d represents an area of the vertical section; and e represents an area occupied by all the columnar Fe crystals in the vertical section. The grain size of the columnar Fe crystals is defined as a maximum length in a direction intersecting a direction of growth of the columnar Fe crystals, i.e., in a diametrical direction. In measuring the B content, 1 g of a sample was taken from each of the examples and subjected to a plasma-jet emission spectroscopy (ICP). The B content in each of the examples 1, 7, 11 and 15 may be regarded as an impurity, because no boric acid was added into the plating bath.

Figure 25:
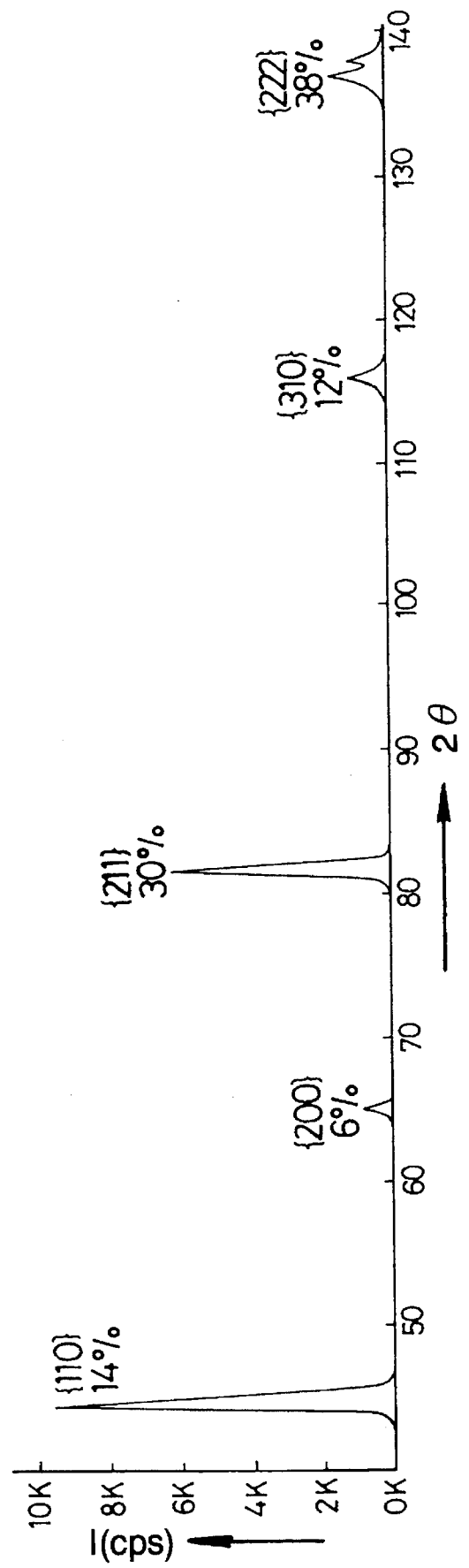
FIG. 25 is an X-ray diffraction pattern for the slide surface construction.
Figure 26:
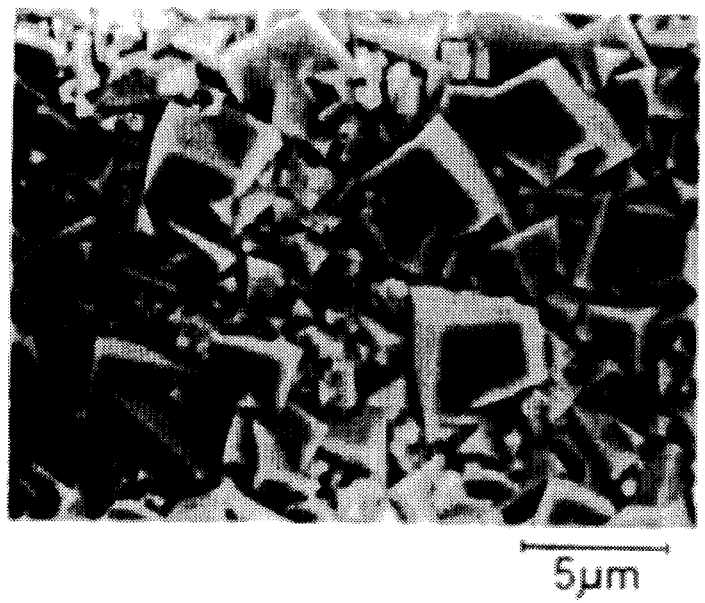
FIG. 26 is a photomicrograph showing the crystal structure of a slide surface.
Figure 27:
FIG. 27 is a photomicrograph showing the crystal structure of a vertical section of the slide surface construction.

FIG. 25 is an X-ray diffraction pattern of the example 3. FIG. 26 is a photomicrograph showing the crystal structure of the slide surface in the example 3, and FIG. 27 is photomicrograph showing the crystal structure of the vertical section. In FIG. 26, a large number of trigonal pyramid-shaped Fe crystal, a large number of small pyramid-shaped Fe crystals and a large number of granular Fe crystals are observed. In FIG. 27, a white area is columnar Fe crystals, and a black area is granular Fe crystals. The trigonal pyramid-shaped Fe crystal is a {222} oriented Fe crystal with its {hhh} plane, i.e., {222} plane oriented toward the slide surface, and the small pyramid-shaped Fe crystal is a {211} oriented Fe crystal with its {2 hhh} plane, i.e., {211} plane oriented toward the slide surface.

Figure 28:
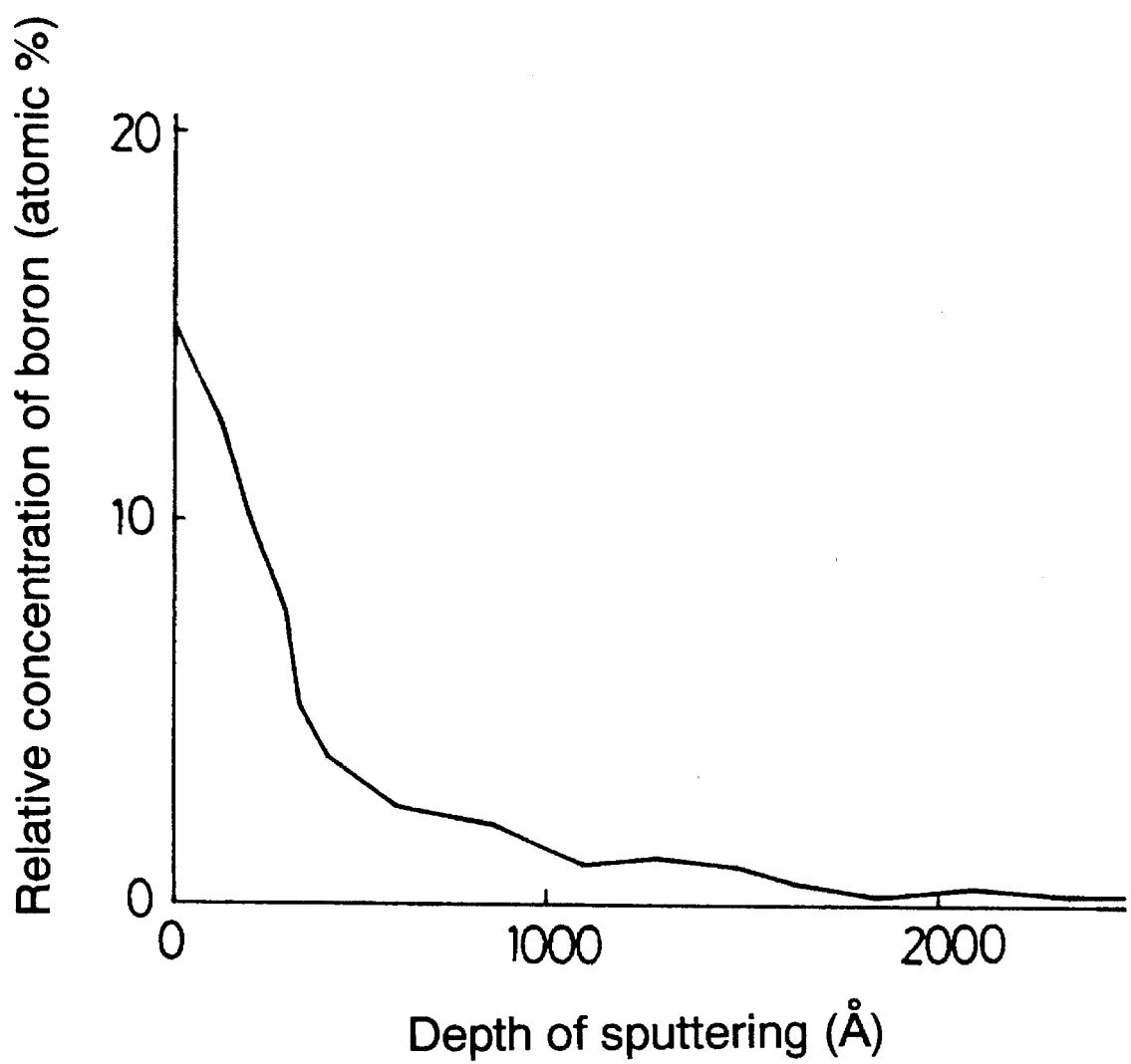
FIG. 28 is a graph illustrating the relationship between the depth of sputtering and the relative concentration of boron.

FIG. 28 shows results obtained from an analysis carried out for the boron in the example 3 by an Auger electron spectroscope (AES). This analysis was conducted by sampling one columnar Fe crystal from the example 3 and applying fast electronic radiation to a side surface of the sampled crystal to measure a concentration of boron in a depth direction. It can be seen from FIG. 28 that the concentration of boron is higher in the side surface of the columnar Fe crystal and hence, boron was preferentially precipitated at a grain boundary between the columnar Fe crystals.

As is apparent from Table 13, if the B content is set in the range of $B \geq 0.01\%$ by weight in the examples 1 to 14 having an area rare $A_1$ of the columnar Fe crystals equal to or greater than 30%, the grain size of the columnar Fe crystals is finely divided as in the examples 3, 4, 6, 9, 10, 13 and 14 and as a result, the hardness of those examples 3 or the like is abruptly increased.

For the examples 15 to 18, because the area rate $A_1$ of the columnar Fe crystal is 5%, the chance for the columnar Fe crystals to grow adjacent one another is decreased, resulting in a small effect of inhibiting the diametrical growth by the precipitation of boron. Therefore, even if the B content is set in the range of $B \geq 0.01\%$ by weight, as in examples 17 and 18, the grain size is varied little, if at all, and the extent of increase in hardness is low.

A tensile test was carried out for the examples 1 to 18 to provide results given in Table 14. The tensile test was carried out by peeling off each of the examples 1 to 18 from the base material and applying a tensile load to each of the examples 1 to 18 in a direction intersecting the direction of growth of the columnar Fe crystals. Each test piece has a length of 50 mm in the direction intersecting the growth direction, a width of 40 mm and a thickness of 20 μm.

TABLE 14

| Slide surface construction | Tensile strength (MPa) | Slide surface construction | Tensile strength (MPa) |
|---|---|---|---|
| Example No. 1 | 250 | Example No. 10 | 450 |
| Example No. 2 | 275 | Example No. 11 | 360 |
| Example No. 3 | 350 | Example No. 12 | 380 |
| Example No. 4 | 420 | Example No. 13 | 430 |
| Example No. 5 | 275 | Example No. 14 | 490 |
| Example No. 6 | 350 | Example No. 15 | 420 |
| Example No. 7 | 300 | Example No. 16 | 440 |
| Example No. 8 | 320 | Example No. 17 | 460 |
| Example No. 9 | 380 | Example No. 18 | 510 |

Figure 29:
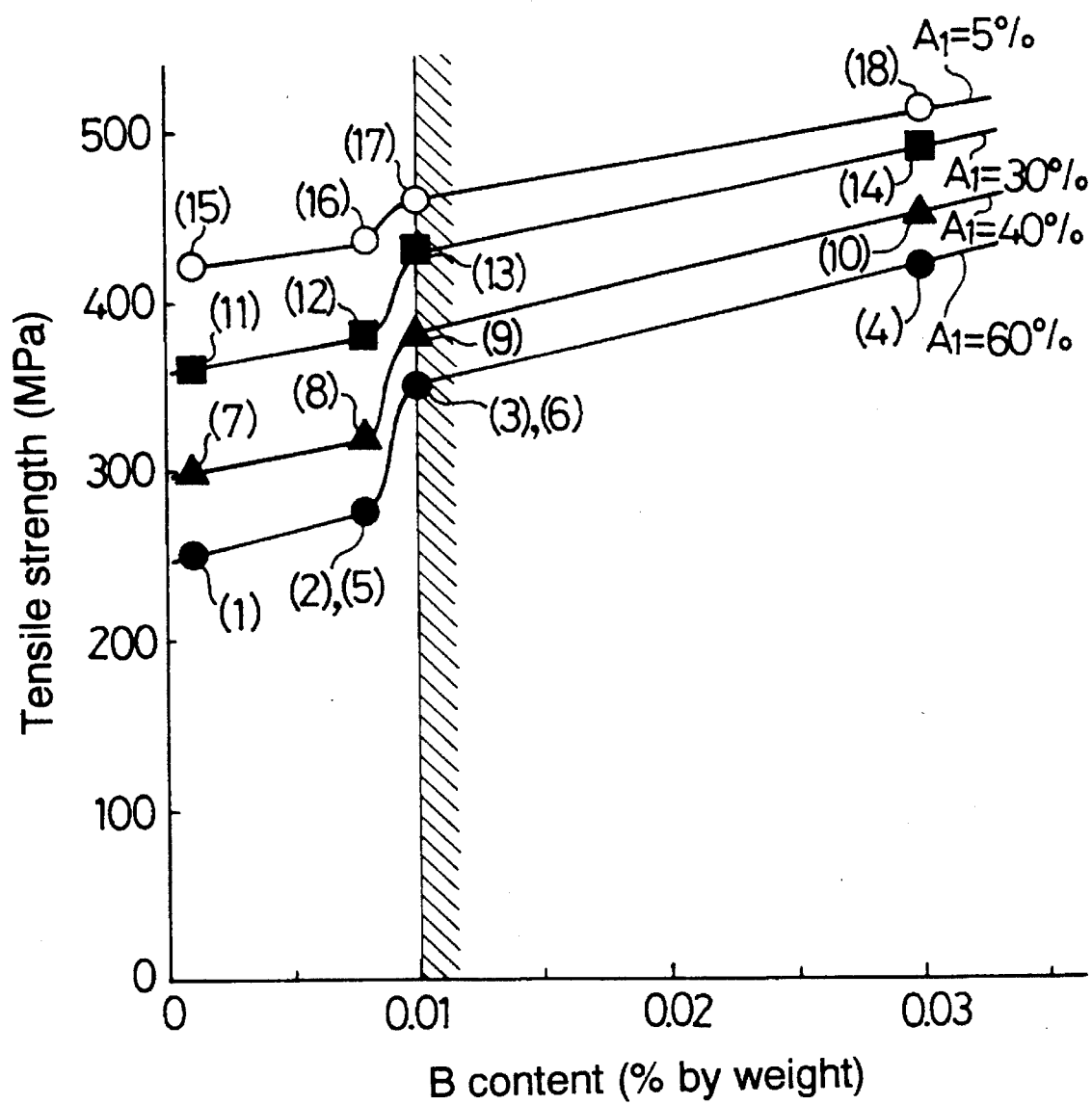
FIG. 29 is a graph illustrating the relationship between the B content and the tensile strength.

FIG. 29 is a graph illustrating the relationship between the B content and the tensile strength for the examples 1 to 18. In FIG. 29, the points (1) to (18) correspond to the examples 1 to 18, respectively. It can be seen from FIG. 29 that if the B content is set in the range of $B \geq 0.01\%$ by weight, the tensile strength is relatively suddenly increased. In this case, if the B content is set in the range of $B \geq 0.01\%$ by weight when the area rate $A_1$ of the columnar Fe crystals is equal to or greater than 30%, the strength is slightly decreased for the same B content.

Figure 30:
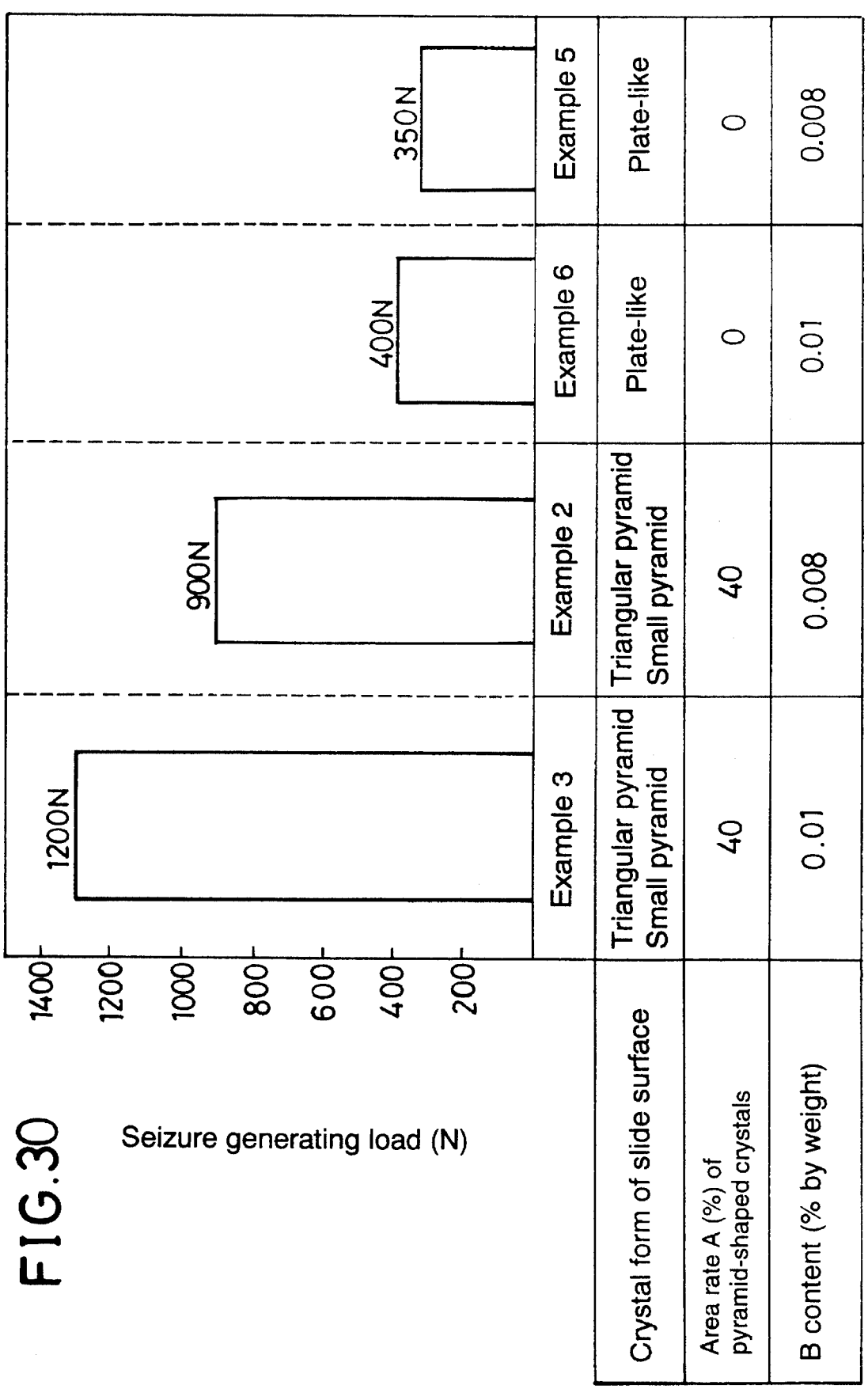
FIG. 30 is a graph illustrating the seizure generating load for four examples.

Chips having the construction of examples 2, 3, 5 and 6 were fabricated and subjected to a seizure test in a chip-on-disk manner under lubrication to measure a seizure generating load, thereby providing results shown in FIG. 30. Conditions for the test are as follows: the material of the disk is an Al-10% by weight of Si alloy; the rotational speed of the disk was 15 m/sec; the amount of oil supplied was 0.3 ml/min; and the area of the slide surface of the chip was 1 cm².

If the examples 2 and 3 are compared with each other in FIG. 30, they have the same area rate A of the trigonal and small pyramid-shaped Fe crystals and initially have the equivalent oil retention. However, the example 3 has a B content equal to or greater than 0.01% by weight and a higher hardness than that of the example 2. Therefore, the example 3 exhibits an excellent wear resistance, so that the oil retention is maintained. Consequently, the example 3 has a seizure resistance superior to the example 2. On the other hand, the example 6 has a high hardness, as compared with the example 5. However, the oil retention in both the examples 5 and 6 is lower due to the crystal form of the slide surface, resulting in a substantially reduced seizure resistance of the examples 5 and 6, as compared with the examples 2 and 3.

(II) By way of another example of this fourth embodiment, a plurality of piston pins 1 for an internal combustion engine were produced by subjecting an outer peripheral surface 3 of a round tubular base material 2 of steel (JIS SCM420) to form a slide surface construction 4 formed of an aggregate of Fe crystals and having a thickness of 20 μm.

Table 15 shows conditions for the electrical Fe-plating for examples 1a to 6a of slide surface constructions. The plating time was varied in a range of 10 to 60 minutes in order to set the thickness of the examples 1a to 6a to 20 μm, as described above. The amount of replenisher supplied was set at 0.5 liters/min.

columnar Fe crystals in a vertical section, the presence rate S of oriented Fe crystals, the B content and the hardness in the vertical section for the examples 1a to 6a.

TABLE 15

| | Plating bath | | | | | | | |
|---|---|---|---|---|---|---|---|---|
| | Composition (g/liter) | | | | Pulse current process | | | |
| Slide surface construction | Ferrous sulfate | Boric acid | pH | Temperature (°C.) | $CD_{max}$ $(A/dm^2)$ | $CD_m$ $(A/dm^2)$ | $T_{ON}/T_C$ | $T_{ON}$ (msec) |
| Example No. 1a | 300 | 1.5 | 6 | 50 | 20 | 4 | 0.2 | 2 |
| Example No. 2a | 200 | 1.5 | 6 | 50 | 20 | 4 | 0.2 | 2 |
| Example No. 3a | 150 | 1.5 | 6 | 50 | 15 | 3 | 0.2 | 2 |
| Example No. 4a | 300 | 1 | 6 | 50 | 20 | 4 | 0.2 | 2 |
| Example No. 5a | 200 | 1 | 6 | 50 | 20 | 4 | 0.2 | 2 |
| Example No. 6a | 150 | 1 | 6 | 50 | 15 | 3 | 0.2 | 2 |

Table 16 shows the crystal form, the area rate A of trigonal pyramid-shaped or small angular pyramid-shaped Fe crystals in a slide surface, the area rate $A_1$ and grain size of

TABLE 16

| Slide surface construction | Crystal form of slide surface | Area rate A (%) of trigonal or small pyramid-Fe crystal | Columnar Fe crystal | | Presence rate S of oriented Fe crystasl (%) | | | | | B content (% by weight) | Hardness HmV |
|---|---|---|---|---|---|---|---|---|---|---|---|
| | | | Area rate $A_1$ (%) | Grain size (μm) | {110} | {200} | {211} | {310} | {222} | | |
| Example No. 1a | Trigonal pyramid Granular | 60 | 60 | 0.5–5 | 8 | 9 | 10 | 11 | 62 | 0.01 | 410 |
| Example No. 2a | Trigonal pyramid Granular | 40 | 40 | 0.5–5 | 10 | 18 | 11 | 18 | 43 | 0.01 | 400 |
| Example No. 3a | Trigonal pyramid Granular | 30 | 60 | 0.5–4 | 9 | 8 | 40 | 10 | 33 | 0.01 | 400 |
| Example No. 4a | Trigonal pyramid Granular | 60 | 60 | 0.5–5 | 9 | 10 | 10 | 10 | 61 | 0.008 | 250 |
| Example No. 5a | Trigonal pyramid Granular | 40 | 40 | 0.5–5 | 8 | 19 | 10 | 19 | 44 | 0.008 | 240 |
| Example No. 6a | Trigonal pyramid Granular | 30 | 60 | 0.5–4 | 11 | 7 | 38 | 10 | 34 | 0.008 | 240 |

The methods for determining the area rate A and the presence rate S of trigonal or small pyramid-shaped Fe crystals are the same as in the first embodiment, and the methods for determining the grain size and the B content of the columnar Fe crystals are the same as in the first example (I) of this fourth embodiment.

Chips having the examples 1a to 6a were fabricated and subjected to a seizure test in a chip-on-disk manner under lubrication to measure the seizure generating load, thereby providing results given in Table 17. Data relating to the examples 2, 3, 5 and 6 shown in FIG. 30 are also given in Table 17. Conditions for the test are as follows: the material of the disk was an Al-10% by weight of Si alloy; the rotational speed of the disk was 15 m/sec; the amount of oil supplied was 0.3 ml/min; and the area of the slide surface of each of the chips was 1 cm$^2$.

TABLE 17

| Slide surface construction | Seizure generating load (N) |
| --- | --- |
| Example No. 1a | 1400 |
| Example No. 2a | 1300 |
| Example No. 3 | 1300 |
| Example No. 3a | 600 |
| Example No. 6 | 400 |
| Example No. 4a | 1000 |
| Example No. 5a | 900 |
| Example No. 2 | 900 |
| Example No. 6a | 550 |
| Example No. 5 | 350 | and equal to 60% in the example 3. It can be seen from this that in the slide surface construction, the area rate A of the pyramid-shaped metal crystals such as the trigonal and small pyramid-shaped Fe crystals may be set in a range of $A_1 \geq 40\%$; the B content may be set in a range of $B \geq 0.01\%$ by weight; and the area rate $A_1$ of the columnar metal crystals such as the columnar Fe crystals may be set in a range of $A_1 \geq 40\%$.

The slide surface construction is not limited to only the piston pin 1, and is applicable to various slide members such as a skirt portion of a piston or the like.

Fifth embodiment

A slide surface construction 4 according to the fifth embodiment is formed on an outer peripheral surface 3 of a round tubular base material 2 of steel (JIS SCM420) to constitute a surface layer of a piston pin 1 for an internal combustion engine, as shown in FIG. 1, as in the first embodiment. The slide surface construction 4 may contain at least one element selected from carbon and hydrogen which are added elements, or boron which is an added element, or boron which is a necessary added element, and may contain at least one element selected from carbon and hydrogen as a selective added element.

In such cases, the C content is in a range of $C \geq 0.03\%$ by weight; the H content is in a range of $H \geq 0.01\%$ by weight; and the B content is in a range of $B \geq 0.01\%$ by weight.

Table 18 shows conditions for an electrical Fe-plating for examples 1 to 8 of the slide surface constructions 4. The plating time was varied in a range of 10 to 60 minutes in order to set the thickness of the examples 1 to 8 to 20 μm. The amount of replenisher supplied was set at 0.5 liters/min.

TABLE 18

| Slide surface construction | Plating bath | | | | | Pulse current process | | | |
| --- | --- | --- | --- | --- | --- | --- | --- | --- | --- |
| | Composition (g/liter) | | | | | | | | |
| | Ferrous sulfate | saccharin | Boric acid | pH | Temperature (°C.) | CDmax (A/dm$^2$) | CDm (A/dm$^2$) | $T_{ON}/T_C$ | $T_{ON}$ (msec) |
| Example No. 1 | 400 | 0 | 0 | 6 | 50 | 20 | 4 | 0.2 | 2 |
| Example No. 2 | 400 | 0.75 | 0 | 6 | 50 | 40 | 8 | 0.2 | 2 |
| Example No. 3 | 400 | 0 | 0 | 6 | 45 | 20 | 4 | 0.2 | 2 |
| Example No. 4 | 400 | 0.75 | 0 | 6 | 45 | 20 | 4 | 0.2 | 2 |
| Example No. 5 | 400 | 0 | 1.5 | 6 | 50 | 20 | 4 | 0.2 | 2 |
| Example No. 6 | 400 | 0.75 | 1.5 | 6 | 50 | 20 | 4 | 0.2 | 2 |
| Example No. 7 | 400 | 0 | 1.5 | 6 | 45 | 20 | 4 | 0.2 | 2 |
| Example No. 8 | 400 | 0.75 | 1.5 | 6 | 45 | 40 | 8 | 0.2 | 2 |

Figure 31:
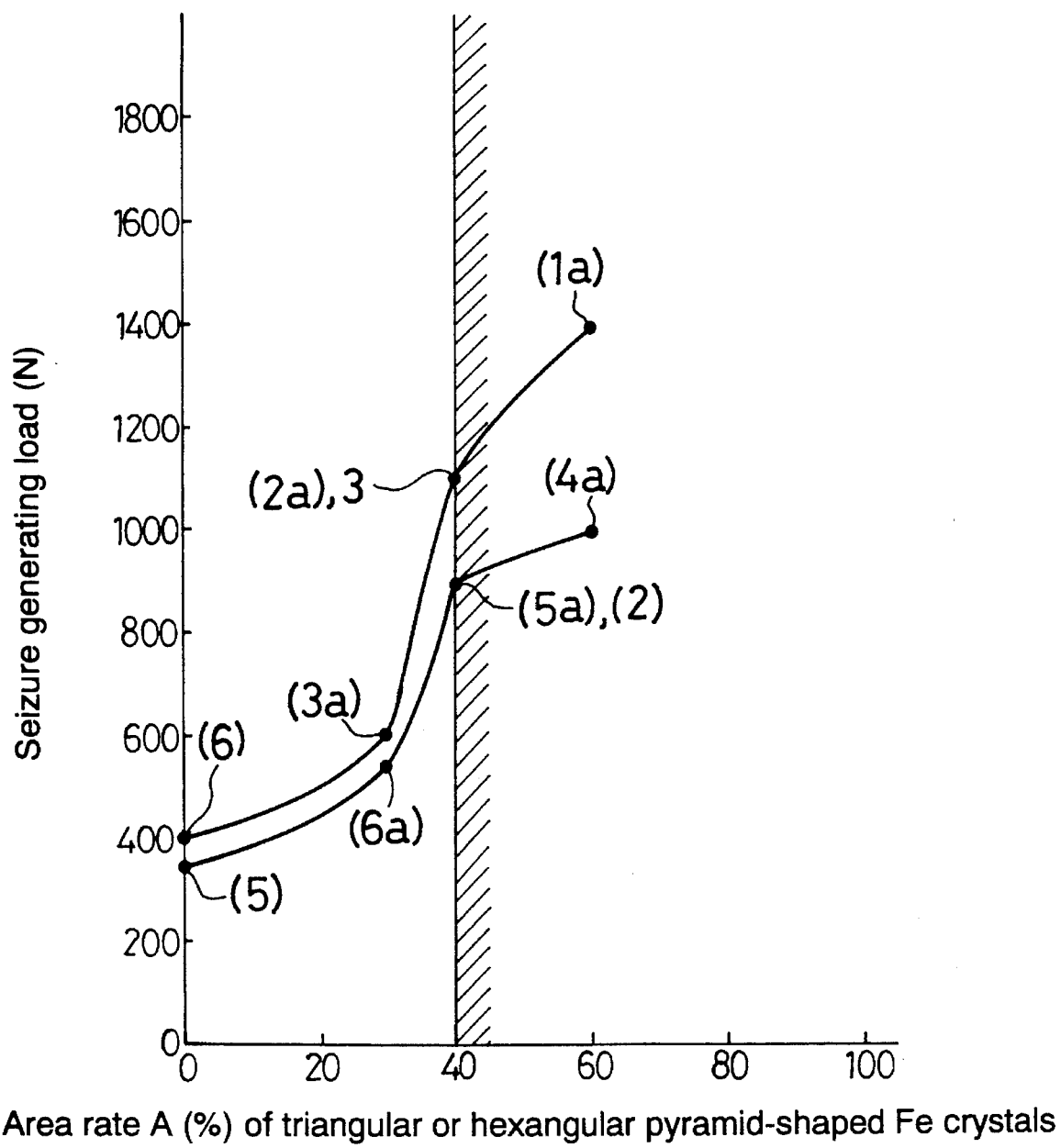
FIG. 31 is a graph illustrating the relationship between the area rate A of trigonal pyramid-shaped or small pyramid-shaped Fe crystals and the seizure generating load.

FIG. 31 illustrates the area rate A of the trigonal or small pyramid-shaped Fe crystals in relationship to the seizure generating load. In FIG. 31, the points (1a) to (6a), 2, 3, 5 and 6 correspond to the example 1a to 6a, 2, 3, 5 and 6, respectively. As apparent from FIG. 31, if the area rate A is set in a range of $A \geq 40\%$, the seizure generating load is substantially increased as in the examples 1a, 2a, 4a, 5a, 2 and 3. Each of the examples 1a, 2a and 3 with the B content set in a range of $B \geq 0.01\%$ by weight has a seizure resistance superior to those of the examples 4a, 5a and 2.

In this case, the examples 2a and 3a exhibit the equivalent seizure resistance, because the area rate A of the trigonal or small pyramid-shaped Fe crystals is 40%. However, the area rate $A_1$ of the columnar Fe crystals is 40% in the example 2a Table 19 shows the crystal form of the slide surface, the area rate A and the grain size of hexagonal pyramid-shaped Fe crystals, the presence rate S of oriented Fe crystals, the C content, the H content, the B content and the hardness in a section of the slide surface construction for the examples 1 to 8.

TABLE 19

| Slide surface construction | Crystal form of slide surface | Hexagonal Pyramid Fe crystal Area rate (%) | Hexagonal Pyramid Fe crystal Grain size (μm) | Presence rate S of oriented Fe crystal (%) {110} | {200} | {211} | {310} | {222} | C* | H* | B* | Hardness HmV |
|---|---|---|---|---|---|---|---|---|---|---|---|---|
| Example No. 1 | Hexagonal pyramid | 90 | 1–4 | 0.7 | 2 | 5.1 | 0.8 | 91.4 | 0.008 | 0.004 | 0.001 | 200 |
| Example No. 2 | Hexagonal pyramid | 90 | 1–3 | 0.9 | 2.1 | 5.5 | 1.2 | 90.3 | 0.03 | 0.004 | 0.001 | 380 |
| Example No. 3 | Hexagonal pyramid | 90 | 1–3 | 0.5 | 1.8 | 6.1 | 0.8 | 90.8 | 0.008 | 0.01 | 0.001 | 380 |
| Example No. 4 | Hexagonal pyramid | 90 | 1–3 | 0.6 | 1.9 | 5.1 | 1.4 | 91 | 0.03 | 0.01 | 0.001 | 410 |
| Example No. 5 | Hexagonal pyramid | 90 | 1–3 | 1 | 2.4 | 4.8 | 1.3 | 90.5 | 0.008 | 0.004 | 0.01 | 400 |
| Example No. 6 | Hexagonal pyramid | 90 | 1–3 | 0.7 | 2.4 | 5.3 | 0.7 | 90.9 | 0.03 | 0.004 | 0.01 | 400 |
| Example No. 7 | Hexagonal pyramid | 90 | 1–3 | 0.8 | 2.2 | 5.7 | 1.1 | 90.2 | 0.008 | 0.01 | 0.01 | 400 |
| Example No. 8 | Hexagonal pyramid | 90 | 1–3 | 0.8 | 2.5 | 5.8 | 0.9 | 90 | 0.03 | 0.01 | 0.01 | 450 |

C* = C content (% by weight)
H* = H content (% by weight)
B* = B content (% by weight)

The methods for determining the area rate A, the grain size, the presence rate S and the C content in Table 19 are the same as in the first embodiment. The method for determining the H content is the same as in the third embodiment, and the method for determining the B content is the same as in the fourth embodiment. Further, if the C, H and B contents are equal to 0.008% by weight, 0.004% by weight and 0.001% by weight, respectively, they may be regarded as impurities, because no special measure was not taken in order to incorporate them.

Chips having the examples 1 to 8 were fabricated and subjected to a seizure test in a chip-on-disk manner under lubrication to measure the seizure generating load, thereby providing results given in Table 20. Conditions for the test are as follows: the material of the disk is an Al-10% by weight of Si alloy; the rotational speed of the disk was 15 m/sec; the amount of oil supplied was 0.3 ml/min; arid the area of the slide surface of the chip was 1 cm$^2$.

TABLE 20

| Slide surface construction | Seizure generating load (N) |
|---|---|
| Example No. 1 | 1400 |
| Example No. 2 | 2000 |
| Example No. 3 | 1800 |
| Example No. 4 | 2100 |
| Example No. 5 | 1800 |
| Example No. 6 | 2100 |
| Example No. 7 | 2050 |
| Example No. 8 | 2300 |

Figure 32:
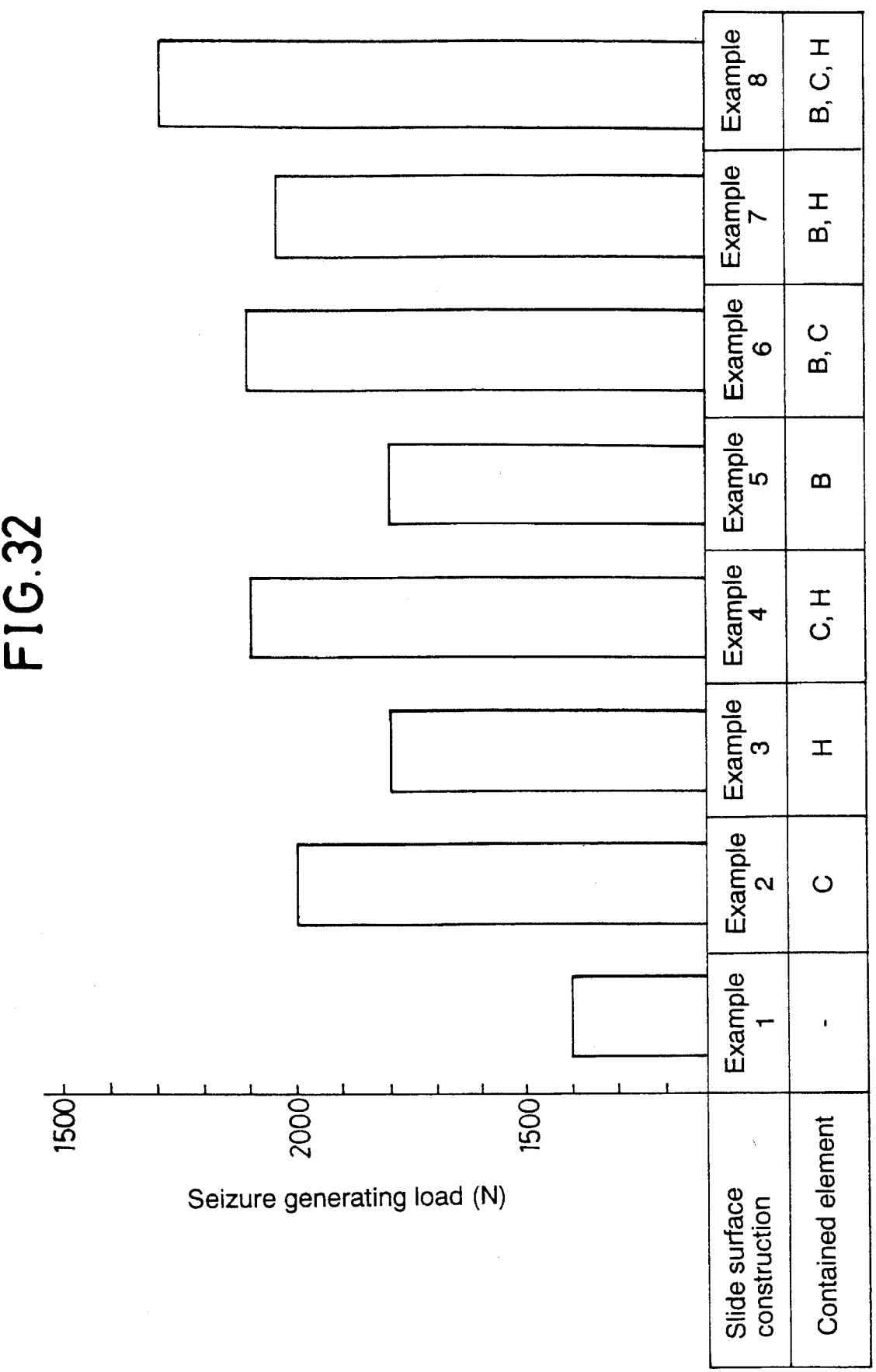
FIG. 32 is a graph illustrating the relationship between the elements contained in the slide surface construction and the seizure generating load.

FIG. 32 is a graph illustrating the relationship between the contained elements and the seizure generating load for the examples 1 to 8. It can be seen from Table 20 and FIG. 32 that the slide surface construction containing carbon or hydrogen alone, as in the examples 2 and 3, has a seizure generating load lower than the slide surface construction containing both carbon and hydrogen, as in the example 4. The same is true with regard to boron and the other two elements, i.e., carbon and hydrogen, when all three are contained as in the example 8, the seizure generating load is the highest in these examples.

What is claimed is:

1. A high-hardness metal skin film formed of an aggregate of metal crystals, wherein an area rate A of pyramid-shaped metal crystals in a surface of said skin film is in a range of A≧40%, and said aggregate contains at least one element selected from carbon (C) and hydrogen (H) as an added element, the content of carbon (C) being in a range of C≧0.03% by weight, and the content of hydrogen (H) being in a range of H≧0.01% by weight.

2. A high-hardness metal skin film according to claim 1, wherein at least a portion of hydrogen is present within said pyramid-shaped metal crystals.

3. A high-hardness metal skin film formed of an aggregate of metal crystals, wherein said aggregate includes a large number of columnar metal crystals each grown from a base material and each having a tip end of pyramid-shaped metal crystal, an area rate A of said pyramid-shaped metal crystals in a surface of said skin film being in a range of A≧40%, and a content of boron (B) in said aggregate being in a range of B≧0.01% by weight.

4. A high-hardness metal skin film formed of an aggregate of metal crystals according to claim 3, wherein an area rate $A_1$ of said columnar metal crystals in a vertical section of said metal skin film is in a range of $A_1$≧40%.

5. A high-hardness metal skin film formed of an aggregate of metal crystals, wherein said aggregate includes a large number of columnar metal crystals each grown from a base material and each having a tip end of pyramid-shaped metal crystal, an area rate A of said pyramid-shaped metal crystals in a surface of said skin film being in a range of A≧40%, and said aggregate contains boron (B) as a necessary added element and at least one element selected from carbon (C) and hydrogen (H) as a selective added element, the content of boron (B) being in a range of B≧0.01% by weight, the content of carbon (C) being in a range of C≧0.03% by weight, and the content of hydrogen (H) being in a range of H≧0.01% by weight.

6. A high-hardness metal skin film according to claim 1, 2, 3, 4 or 5, wherein each said metal crystal has a body-centered cubic structure, and each said pyramid-shaped metal crystal is at least one of an (hhh) oriented metal crystal with its (hhh) plane (by Miller indices) oriented toward a skin film surface and a (2 hhh) oriented metal crystal with its (2 hhh) plane (by Miller indices) oriented toward the skin film surface.

7. A high-hardness metal skin film according to claim 1, 2, 3, 4 or 5, wherein each said metal crystal is an Fe crystal, and each said pyramid-shaped metal crystal is an (hhh) oriented Fe crystal with its (hhh) plane (by Miller indices) oriented toward a skin film surface and having a hexagonal pyramidal shape.

8. A high-hardness metal skin film formed of an aggregate of metal crystals, wherein said aggregate includes a large number of columnar metal crystals grown from a base material and contains boron, the content of boron being set in a range of $B \geq 0.01\%$ by weight, and wherein a tip end of said columnar metal crystal is in the form of a pyramid-shaped metal crystal.

9. A high-hardness metal skin film according to claim 8, wherein an area rate $A_1$ of said columnar metal crystals in a vertical section of said metal skin film is in a range of $A_1 \geq 30\%$.

10. A high-hardness metal skin film formed of an aggregate of metal crystals, wherein said aggregate includes an area rate A of pyramid-shaped metal crystals in a surface of the skin film of $A \geq 40\%$, and said aggregate contains at least one element selected from boron (B), carbon (C) and hydrogen (H), the content of boron (B) being $B \geq 0.01\%$ by weight, the content of carbon (C) being $C \geq 0.03\%$ by weight, and the content of hydrogen (H) being $H \geq 0.01\%$ by weight.

11. A high-hardness metal skin film according to claim 10, wherein each said metal crystal has a body-centered cubic structure, and each said pyramid-shaped metal crystal is at least one of an (hhh) oriented metal crystal with its (hhh) plane (by Miller indices) oriented toward a skin film surface and a (2 hhh) oriented metal crystal with its (2 hhh) plane (by Miller indices) oriented toward the skin film surface.

12. A high-hardness metal skin film according to claim 10 or 11, wherein each said metal crystal is an Fe crystal, and each said pyramid-shaped metal crystal is an (hhh) oriented Fe crystal with its (hhh) plane (by Miller indices) oriented toward a skin film surface and having a hexagonal pyramid shape.

13. A high-hardness metal skin film according to claim 6, wherein each said metal crystal is an Fe crystal, and each said pyramid-shaped metal crystal is an (hhh) oriented Fe crystal with its (hhh) plane (by Miller indices) oriented toward a skin film surface and having a hexagonal pyramid shape.

* * * * *